US012785726B2

(12) United States Patent
Hou et al.

(10) Patent No.: US 12,785,726 B2
(45) Date of Patent: Nov. 3, 2026

(54) RADIO FREQUENCY FRONT-END CIRCUIT

(71) Applicant: Huawei Technologies Co., Ltd., Shenzhen (CN)

(72) Inventors: Hangtian Hou, Shanghai (CN); Huayong Jia, Shanghai (CN); Xudong Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/620,047

(22) Filed: Mar. 28, 2024

(65) Prior Publication Data

US 2024/0333319 A1 Oct. 3, 2024

(30) Foreign Application Priority Data

Mar. 29, 2023 (CN) ......................... 202310351676.4

(51) Int. Cl.
*H04B 1/00* (2006.01)
*H03H 7/18* (2006.01)
*H04B 1/16* (2006.01)
*H04B 7/08* (2006.01)

(52) U.S. Cl.
CPC ............. *H04B 1/006* (2013.01); *H04B 1/001* (2013.01); *H04B 1/1615* (2013.01)

(58) Field of Classification Search
None
See application file for complete search history.

(56) References Cited

U.S. PATENT DOCUMENTS 7,251,499 B2 * 7/2007 Ella ........................ H04B 1/006 343/893
7,541,894 B2 * 6/2009 Miyaguchi ............ H03H 11/20 333/139
7,580,727 B2 * 8/2009 Boyle .................... H04B 1/406 455/168.1
8,396,435 B2 * 3/2013 Nagayama ............. H03F 3/195 455/127.1
9,608,688 B2 * 3/2017 Khlat ................... H04B 1/0057
9,941,908 B2 * 4/2018 Bauder .................. H04B 1/525
9,998,153 B2 * 6/2018 Balm ..................... H04B 1/006
10,530,415 B2 * 1/2020 Ella ...................... H04B 1/0458
10,560,137 B2 * 2/2020 Bai .......................... H04Q 3/00
10,567,012 B2 * 2/2020 Zhang .................. H04B 1/0057

(Continued)

*Primary Examiner* — Tuan A Tran
(74) *Attorney, Agent, or Firm* — Slater Matsil, LLP

(57) ABSTRACT

This application provides a radio frequency front-end circuit, comprising: A first switch group includes a first output end and a second output end, configured to selectively transmit, to the first output end and the second output end, a carrier aggregation signal received from an antenna; a phase-shift filter is coupled to the second output end, and is configured to: perform phase-shifting and filtering on the carrier aggregation signal, and output a phase-shifted filtered signal; a second switch group includes at least one third output end, and each third output end is configured to output the phase-shifted filtered signal; and the at least one third output end is coupled to a second filter and a third filter, and the second filter and the third filter are configured to: separately perform filtering on the phase-shifted filtered signal, and then respectively output the second frequency band signal and the third frequency band signal.

20 Claims, 10 Drawing Sheets

(56) References Cited

U.S. PATENT DOCUMENTS

| | | | | |
|---|---|---|---|---|
| 10,784,903 | B2 * | 9/2020 | Wloczysiak | H04L 5/001 |
| 10,840,951 | B2 * | 11/2020 | Bauder | H04B 7/0602 |
| 10,911,073 | B2 * | 2/2021 | Schmidhammer | H04B 1/006 |
| 11,290,134 | B2 * | 3/2022 | Tahara | H04B 1/0057 |
| 11,637,734 | B2 * | 4/2023 | Kusumoto | H04B 1/0067 370/278 |
| 11,646,782 | B2 * | 5/2023 | Wloczysiak | H04B 1/16 455/179.1 |
| 11,901,920 | B2 * | 2/2024 | Takada | H03F 1/56 |
| 11,901,974 | B2 * | 2/2024 | Seyed | H04B 7/0805 |
| 11,973,522 | B2 * | 4/2024 | Chang | H04Q 11/02 |
| 12,206,383 | B2 * | 1/2025 | Lim | H03H 7/21 |
| 12,388,484 | B2 * | 8/2025 | Nakajima | H04B 1/525 |
| 2014/0293841 | A1 | 10/2014 | Rousu | |
| 2016/0323080 | A1 | 11/2016 | Khlat | |
| 2016/0365878 | A1 * | 12/2016 | Balm | H04B 1/006 |
| 2017/0237451 | A1 | 8/2017 | Khlat et al. | |
| 2019/0181890 | A1 * | 6/2019 | Schmidhammer | H04B 1/0057 |
| 2020/0343930 | A1 * | 10/2020 | DiTommaso | H04B 1/44 |
| 2020/0358460 | A1 * | 11/2020 | Wloczysiak | H04B 1/001 |
| 2021/0006273 | A1 * | 1/2021 | Tahara | H04B 1/0057 |
| 2023/0361850 | A1 * | 11/2023 | Wloczysiak | H04B 1/16 |

* cited by examiner (a)

(b)

RADIO FREQUENCY FRONT-END CIRCUIT

CROSS-REFERENCE TO RELATED APPLICATION

This application claims priority to Chinese Patent Application No. 202310351676.4, filed on Mar. 29, 2023, which is hereby incorporated by reference in its entirety.

TECHNICAL FIELD

Embodiments of this application relate to the field of chip technologies, and in particular, to a radio frequency front-end circuit.

BACKGROUND

In a radio frequency front-end circuit in which multiple-input multiple-output (MIMO) and carrier aggregation (CA) technologies are applied, with development of a 5th generation mobile communication technology (5G), types of communication frequency bands gradually increase, and combinations of multi-band carrier aggregation also increase accordingly. To implement screening of a plurality of types of frequency bands, a phase shifter usually needs to be added to a radio frequency channel of the radio frequency front-end circuit. For the radio frequency channel, frequency band screening on the radio frequency channel may be implemented in combination with the phase shifter and a filter.

However, the phase shifter has a complex design, and usually includes elements such as a plurality of inductors and capacitors. A limitation of a quality factor (Q value) of each component results in an extra insertion loss. A more complex phase-shifting network including phase shifters on a plurality of radio frequency channels indicates a larger insertion loss. Due to the large insertion loss, a noise factor of a receive channel may increase, and power consumption of a power amplifier of a transmit channel may increase. In addition, area occupation of the complex phase-shifting network on a substrate is large and costs of the complex phase-shifting network are high.

SUMMARY

Embodiments of this application provide a radio frequency front-end circuit, to reduce an insertion loss, area occupation on a substrate, and costs that are caused by a phase shifter in the radio frequency front-end circuit.

To achieve the foregoing objective, the following technical solutions are used in embodiments of this application.

According to a first aspect, a radio frequency front-end circuit is provided, where the radio frequency front-end circuit includes: a first switch group, including a first output end and a second output end, where the first switch group is configured to selectively transmit, to the first output end and the second output end, a carrier aggregation signal received from an antenna, where the carrier aggregation signal includes at least a first frequency band signal, a second frequency band signal, and a third frequency band signal that are aggregated; and the first output end is coupled to a first filter, and the first filter is configured to: perform filtering on the carrier aggregation signal, and output the first frequency band signal; a phase-shift filter, coupled to the second output end, and configured to: perform phase-shifting and filtering on the carrier aggregation signal, and output a phase-shifted filtered signal, where the phase-shifted filtered signal includes the second frequency band signal and the third frequency band signal; and a second switch group, coupled to the phase-shift filter, where the second switch group includes at least one third output end, each third output end is configured to output the phase-shifted filtered signal, the at least one third output end is coupled to a second filter and a third filter, and the second filter and the third filter are configured to: separately perform filtering on the signal processed by the phase-shift filter, and then respectively output the second frequency band signal and the third frequency band signal.

Therefore, in this application, the phase-shift filter has both a phase-shifting function and a filtering function. For example, the phase-shift filter has both a function of the filter between the first switch group and the second switch group and a function of the phase shifter coupled to the second filter. In other words, in a receiving process of the carrier aggregation signal, a circuit of the phase shifter between the second switch group and the second filter is omitted. In this way, the function of the phase shifter is combined with the function of the filter, and the filtering function and the phase-shifting function are implemented simultaneously, to reduce an area and insertion loss costs caused by an independent phase shifter. Especially, for obtaining a frequency band signal that is in the carrier aggregation signal and of which frequency range is between frequency ranges of a plurality of frequency band signals on a receive channel, for example, a frequency range of a second frequency band signal is between a frequency range of a first frequency band signal and a frequency range of a third frequency band signal, if an independent phase shifter and filter are used on the receive channel to perform frequency band screening, a design of the phase shifter needs to meet that the two frequency band signals (the first frequency band signal and the third frequency band signal) are in a high impedance/open-circuit state simultaneously. A design of a phase shifter is complex, and a caused insertion loss is large. If a function of the phase shifter on a channel on which screening is performed to obtain the frequency band signal of which frequency range is between frequency ranges of a plurality of frequency band signals is moved forward according to this application, a filter with a filtering function also has a phase-shifting function, that is, a phase-shift filter is used to implement phase-shifting, so that when at least one frequency band signal is blocked from passing through the phase-shift filter, an area and insertion loss costs caused by an independent phase shifter on the channel can be avoided. For example, the phase-shift filter blocks the first frequency band signal from passing through, the phase-shift filter outputs the second frequency band signal and the third frequency band signal, the second filter only needs to block the third frequency band signal and output the second frequency band signal, and the third filter only needs to block the second frequency band signal and output the third frequency band signal, to omit the area and the insertion loss caused by phase-shifting performed by the phase shifter.

In a possible design, the phase-shift filter is configured to: perform phase-shifting on the first frequency band signal, and filter out the first frequency band signal. Herein, it may be considered that when a phase of the first frequency band signal is phase-shifted, the phase of the first frequency band signal is phase-shifted to a phase to be blocked by the phase-shift filter, to filter out the first frequency band signal. For example, a phase-shifting amplitude of the first frequency band signal is 90 degrees or 180 degrees. This is not limited in this application.

In a possible design, after phase-shifting, an impedance of a frequency range of the first frequency band signal is in a high impedance state in the phase-shift filter.

The phase-shift filter in this application may change at least one of an inductance value of an inductor and a capacitance value of a capacitor in an original filter, so that the filter has the phase-shifting function, and can perform phase-shifting on an impedance of the frequency range of the first frequency band signal that needs to be blocked to a high impedance state. In this way, the first frequency band signal cannot pass through the phase-shift filter, to reduce an area and insertion loss costs caused by the phase shifter on the receive channel.

In a possible design, the radio frequency front-end circuit further includes: the first filter and a first phase shifter, where the first phase shifter is coupled between the first output end and the first filter, the first phase shifter is configured to perform phase-shifting on the second frequency band signal and the third frequency band signal, and after phase-shifting, impedances of frequency ranges of the second frequency band signal and the third frequency band signal are in a high impedance state in the first filter. On the receive channel on which the phase shifter is not moved forward, the frequency range of the first frequency band signal that needs to pass through may be a frequency band signal with a lowest frequency range or a frequency band signal with a highest frequency range in the carrier aggregation signal. In this way, only that another frequency band signal of which frequency range is higher than that of the first frequency band signal is in a high impedance state needs to be met, and a design of the phase shifter on the channel is simple.

In a possible design, the radio frequency front-end circuit further includes the second filter and the third filter; when there are a plurality of third output ends, the second filter and the third filter are separately coupled to one of the third output ends; the second filter is configured to: filter out the third frequency band signal from the phase-shifted filtered signal, and output the second frequency band signal, where a frequency range of the second frequency signal is between the frequency range of the first frequency signal and a frequency range of the third frequency signal; and the third filter is configured to: filter out the second frequency band signal from the phase-shifted filtered signal, and output the third frequency band signal.

In this design, it may be understood that a function of an original phase shifter that is coupled to the second filter and that is on a receive channel on which the second filter is located is moved forward, a function of an original phase shifter that is coupled to the third filter and that is on a receive channel on which the third filter is located is moved forward, and both are combined with a function of an original filter between the first switch group and the second switch group, to obtain the phase-shift filter. The phase-shift filter can block the first frequency band signal from passing through, so that the second switch group can output the second frequency band signal and the third frequency band signal. Then, the second filter filters out the third frequency band signal and outputs the second frequency band signal, and the third filter filters out the second frequency band signal and outputs the third frequency band signal. When a radio frequency channel on which the second filter is located is conducted, the phase-shift filter only needs to perform phase-shifting, to enable the impedance of the frequency range of the third frequency band signal to meet a high impedance of the second filter. When a radio frequency channel on which the third filter is located is conducted, the phase-shift filter only needs to perform phase-shifting, to enable the impedance of the frequency range of the second frequency band signal to meet a high impedance of the third filter. This can avoid design complexity of the phase shifter when the frequency range of the second frequency band signal is between the third frequency band signal and the first frequency band signal.

In a possible design, the radio frequency front-end circuit further includes a second phase shifter, where the second phase shifter is coupled between the third filter and the third output end corresponding to the third filter, and is configured to perform phase-shifting on the second frequency band signal, and after phase-shifting, the impedance of the frequency range of the second frequency band signal is in a high impedance state in the third filter, where the frequency range of the second frequency band signal is between the frequency range of the first frequency band signal and the frequency range of the third frequency band signal.

In other words, in this way, if the frequency range of the second frequency band signal to be output by the second filter is not a lowest frequency range or a highest frequency range of a plurality of frequency ranges, an original phase shifter coupled to the second filter needs to meet that the plurality of frequency band signals are in a high impedance state. In this way, the original phase shifter coupled to the second filter on the receive channel on which the second filter is located is moved forward, and the phase shifter is combined with the filter between the two switch groups to obtain the phase-shift filter, so that an area and an insertion loss caused by the original phase shifter coupled to the second filter can be avoided.

For example, if the third frequency band signal is finally output on the channel on which the second phase shifter and the third filter are located, possible cases are as follows: The frequency range of the first frequency band signal is larger than the frequency range of the second frequency band signal, and the frequency range of the second frequency band signal is larger than the frequency range of the third frequency band signal; or the frequency range of the first frequency band signal is smaller than the frequency range of the second frequency band signal, and the frequency range of the second frequency band signal is smaller than the frequency range of the third frequency band signal.

Therefore, for a receive channel on which the first filter is located, the first filter only needs to set an impedance of a frequency band signal outside the frequency range of the first frequency band signal to a high impedance, and the second frequency band signal and the third frequency band signal can be blocked from passing through. For the receive channel on which the second filter is located, an original phase shifter coupled to the second filter may be omitted, to avoid an area on a substrate and an insertion loss caused by the phase shifter.

In a possible design, when the second filter and the third filter are coupled to a same third output end, the second filter and the third filter are two filters in a multiplexer. In this case, if the phase-shift filter outputs the second frequency band signal and the third frequency band signal, the multiplexer herein may be a duplexer, and the duplexer may isolate the second frequency band signal and the third frequency band signal and output them separately. If the second frequency band signal is a signal of a combination of two frequency bands, the duplexer herein may be a triplexer, which may separately output signals of two frequency bands in the second frequency band, and output third frequency band signal independently.

In a possible design, the phase-shift filter includes a function of a phase shifter and a function of a low-pass filter;

and the phase-shift filter includes a first inductor, a second inductor, a third inductor, and a capacitor, the first inductor is coupled to the second output end, a second end of the first inductor is coupled to a first end of the second inductor, a second end of the second inductor is coupled to a first input end of the second switch group, a first end of the capacitor is coupled between the first inductor and the second inductor, and a second end of the capacitor is connected in series to the third inductor. A circuit architecture in the phase-shift filter may be a circuit of a low-pass filter. In this application, a component parameter in the low-pass filter may be configured to obtain a phase-shifting amplitude. Certainly, the phase-shift filter that has the function of the phase shifter and the function of the low-pass filter herein is merely an example. A structure of the phase-shift filter that has the function of the phase shifter and the function of the low-pass filter is not limited in this application.

In a possible design, an inductance value ratio of the first inductor to the second inductor is used to adjust a phase-shifting amplitude. In this way, the low-pass filter also has a phase-shifting function. However, in this application, the method for implementing a phase-shifting amplitude is not limited to the method for implementing a phase-shifting amplitude according to an inductance value ratio of the first inductor to the second inductor.

In a possible design, a phase-shifting amplitude of a phase of the first frequency band signal is 90°. Alternatively, a phase-shifting amplitude of a phase of the first frequency band signal is 180°. This is not limited in this application.

In a possible design, the phase-shift filter includes a function of a phase shifter and a function of a band-pass filter.

In a possible design, the phase-shift filter includes a function of a phase shifter, a function of a low-pass filter, and a function of a band-rejection filter.

Although the foregoing design lists a function of a filter in the phase-shift filter, the foregoing design is not limited thereto. For example, the phase-shift filter has the function of the phase shifter and the function of the low-pass filter. Because the phase-shift filter has a phase-shifting function, the impedance of the frequency range of the first frequency band signal may be phase-shifted to be in a high impedance state, and the first frequency band signal cannot pass through the phase-shift filter. Even if the first frequency band signal is a signal with a minimum frequency range in the carrier aggregation signal, the signal cannot pass through the phase-shift filter.

In a possible design, a phase-shifting amplitude existing when the phase-shift filter performs phase-shifting is determined based on at least one of an inductance value of an inductor or a capacitance value of a capacitor in the phase-shift filter.

For example, when the phase-shift filter includes the functions of the low-pass filter and the phase shifter, the inductance value ratio of two inductors in the low-pass filter may be configured, so that the low-pass filter may also have the function of the phase shifter.

According to a second aspect, a radio frequency front-end circuit is provided, where the radio frequency front-end circuit includes: a first switch group, including a first input end, where the first input end is coupled to a first filter, and the first filter is configured to output a first frequency band signal to the first input end; and a second switch group, including at least one second input end, where the at least one second input end is coupled to a second filter and a third filter, and the second filter and the third filter are configured to respectively output a second frequency band signal and a third frequency band signal to the at least one second input end, where the second switch group is further coupled to a phase-shift filter, and the second switch group is configured to selectively output the second frequency band signal and the third frequency band signal to the phase-shift filter; the phase-shift filter is coupled to a third input end of the first switch group, and is configured to: perform phase-shifting and filtering on a received frequency band signal, and output a phase-shifted filtered signal to the third input end of the first switch group, where the phase-shifted filtered signal includes the second frequency band signal and the third frequency band signal; and the first switch group is configured to selectively transmit the first frequency band signal and the phase-shifted filtered signal to an antenna, where the first frequency band signal and the phase-shifted filtered signal are aggregated by the antenna into a carrier aggregation signal and then transmitted.

When the radio frequency front-end circuit is used to transmit the carrier aggregation signal, a technical effect similar to a technical effect in that the radio frequency front-end circuit is used to receive the carrier aggregation signal in the first aspect may be achieved.

In a possible design, the phase-shift filter is configured to: perform phase-shifting on the first frequency band signal, and filter out the first frequency band signal.

In a possible design, after phase-shifting, an impedance of a frequency range of the first frequency band signal is in a high impedance state in the phase-shift filter.

In a possible design, the radio frequency front-end circuit further includes: the first filter and a first phase shifter, where the first phase shifter is coupled between the first input end and the first filter, and is configured to perform phase-shifting on the second frequency band signal and the third frequency band signal, and after phase-shifting, impedances of frequency ranges of the second frequency band signal and the third frequency band signal are in a high impedance state in the first filter.

In a possible design, the radio frequency front-end circuit further includes the second filter and the third filter; when there are a plurality of second input ends, the second filter and the third filter are separately coupled to one of the second input ends; the second filter is configured to: filter out the third frequency band signal from the received frequency band signal, and output the second frequency band signal; and the third filter is configured to: filter out the second frequency band signal from the received frequency band signal, and output the third frequency band signal.

In a possible design, the radio frequency front-end circuit further includes a second phase shifter, where the second phase shifter is coupled between the third filter and the second input end corresponding to the third filter, and is configured to perform phase-shifting on the second frequency band signal, and after phase-shifting, the impedance of the frequency range of the second frequency band signal is in a high impedance state in the third filter, where the frequency range of the second frequency band signal is between the frequency range of the first frequency band signal and the frequency range of the third frequency band signal.

In a possible design, when the second filter and the third filter are coupled to a same second input end, the second filter and the third filter are two filters in a multiplexer.

In a possible design, the phase-shift filter includes a function of a phase shifter and a function of a low-pass filter; and the phase-shift filter includes a first inductor, a second inductor, a third inductor, and a capacitor, the first inductor is coupled to the third input end, a second end of the first inductor is coupled to a first end of the second inductor, a second end of the second inductor is coupled to a first output end of the second switch group, a first end of the capacitor is coupled between the first inductor and the second inductor, and a second end of the capacitor is connected in series to the third inductor.

In a possible design, an inductance value ratio of the first inductor to the second inductor is used to adjust a phase-shifting amplitude.

In a possible design, a phase-shifting amplitude of a phase of the first frequency band signal is 90°.

In a possible design, the phase-shift filter includes a function of a phase shifter and a function of a band-pass filter.

In a possible design, the phase-shift filter includes a function of a phase shifter, a function of a low-pass filter, and a function of a band-rejection filter.

In a possible design, a phase-shifting amplitude existing when the phase-shift filter performs phase-shifting is determined based on at least one of an inductance value of an inductor or a capacitance value of a capacitor in the phase-shift filter.

According to a third aspect, this application provides a communication apparatus, where the communication apparatus includes the radio frequency front-end circuit according to any one of the first aspect or the possible designs of the first aspect and a radio frequency transceiver.

Alternatively, the communication apparatus includes the radio frequency front-end circuit according to any one of the second aspect or the possible designs of the second aspect and a radio frequency transceiver.

According to a fourth aspect, an embodiment of this application provides a signal processing method, where the method is used in the radio frequency front-end circuit according to any one of the first aspect or the possible designs of the first aspect, and the method includes: receiving a carrier aggregation signal, where the carrier aggregation signal includes at least a first frequency band signal, a second frequency band signal, and a third frequency band signal that are aggregated; and performing phase-shifting and filtering on the carrier aggregation signal, to obtain a phase-shifted filtered signal, where the phase-shifted filtered signal includes the second frequency band signal and the third frequency band signal.

According to a fifth aspect, this application provides a terminal device. The terminal device includes the communication apparatus according to the third aspect and an antenna.

It can be understood that any radio frequency front-end circuit, communication apparatus, terminal device, or the like provided above may be applied to the corresponding method provided above. Therefore, for beneficial effects that can be achieved by the radio frequency front-end circuit, the communication apparatus, the terminal device, or the like, refer to beneficial effects in the corresponding method. Details are not described herein again.

These aspects or other aspects in this application are more concise and comprehensible in the following descriptions.

DESCRIPTION OF EMBODIMENTS

Figure 1:
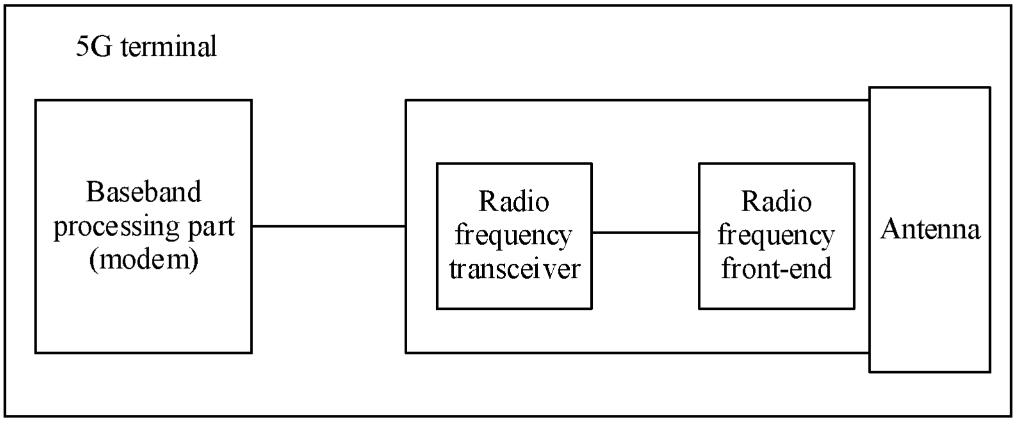
FIG. 1 is a schematic diagram of a structure of a 5G terminal according to an embodiment of this application.

For ease of understanding, some concepts related to embodiments of this application are described for reference by using examples. The concepts are as follows:

Multiple-input multiple-output (MIMO): A plurality of antennas are used to simultaneously transmit and receive a plurality of data streams on a same channel to increase a data transmission rate.

Carrier aggregation (CA): Two or more component carriers (CC) are aggregated, to support a larger transmission bandwidth.

Filter: The filter is a circuit that effectively filters out a frequency of a specific frequency or a frequency other than the frequency.

Filter passband (filter transmission band): The filter passband may be referred to as a passband for short, and may be understood as a frequency range of a signal that is allowed to pass through the filter.

Multiplexer: The multiplexer is a general term for devices of this type, such as a duplexer, a triplexer, and a quadruplexer. The multiplexer has a single input port and a plurality of output ports, and may be understood as a group of non-overlapping filters. It is ensured that these filters are not loaded to each other in a combination manner, and outputs are highly isolated.

Duplexer: The duplexer includes two groups of band-rejection filters with different frequencies, is also referred to as a diplexer, and is a special bidirectional three-end filter. In frequency division multiplexing, a receive channel and a transmit channel operate simultaneously, to prevent a receive signal from being interfered by a transmit signal.

Low-pass filter: The low-pass filter is an electronic filter apparatus that allows a signal with a frequency lower than a cut-off frequency to pass through but does not allow a signal with a frequency higher than the cut-off frequency to pass through.

Band-pass filter: The band-pass filter is a filter that allows a wave on a specific frequency band to pass through and simultaneously shields devices with other frequency bands, or that allows frequency components in a specific frequency range to pass through but attenuates frequency components in other frequency ranges to an extremely low level.

Wave-trap: The wave-trap is a type of band-rejection filter, which can filter out a signal of a specified frequency band by setting a corresponding filter parameter. Corresponding to a fact that an oscillation of a specific frequency may be enhanced in a resonance phenomenon, the wave-trap may attenuate an oscillation of a specific frequency.

Phase shifter: The phase shifter is an apparatus that can adjust a phase of a wave.

Impedance: In a circuit that includes a resistor, an inductor, and a capacitor, an opposition to a current in the circuit is the impedance.

The following describes the technical solutions in embodiments of this application with reference to the accompanying drawings in embodiments of this application. In descriptions in embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for an objective of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

A radio frequency front-end is a core component of a wireless communication device, and is a basic component for converting between a radio electromagnetic wave signal and a binary digital signal. Generally, in a communication system, the radio frequency front-end is a part between an antenna and a medium frequency (or baseband) circuit. A 5G terminal is used as an example. FIG. 1 is a schematic diagram of a structure of a 5G terminal. The 5G terminal includes a baseband processing part and a radio frequency processing part. The baseband processing part usually includes a modem, and the radio frequency processing part includes a radio frequency transceiver and a radio frequency front-end (RFFE). The radio frequency transceiver may be a radio frequency integrated circuit (RFIC). The radio frequency front-end may be coupled to the antenna, and is configured to transmit a signal to the antenna or receive a signal from the antenna. The radio frequency front-end determines important performance indicators such as a communication mode, received signal strength, call stability, and transmit power that can be supported by the mobile terminal, and this directly affects user experience of the terminal.

Figure 2:
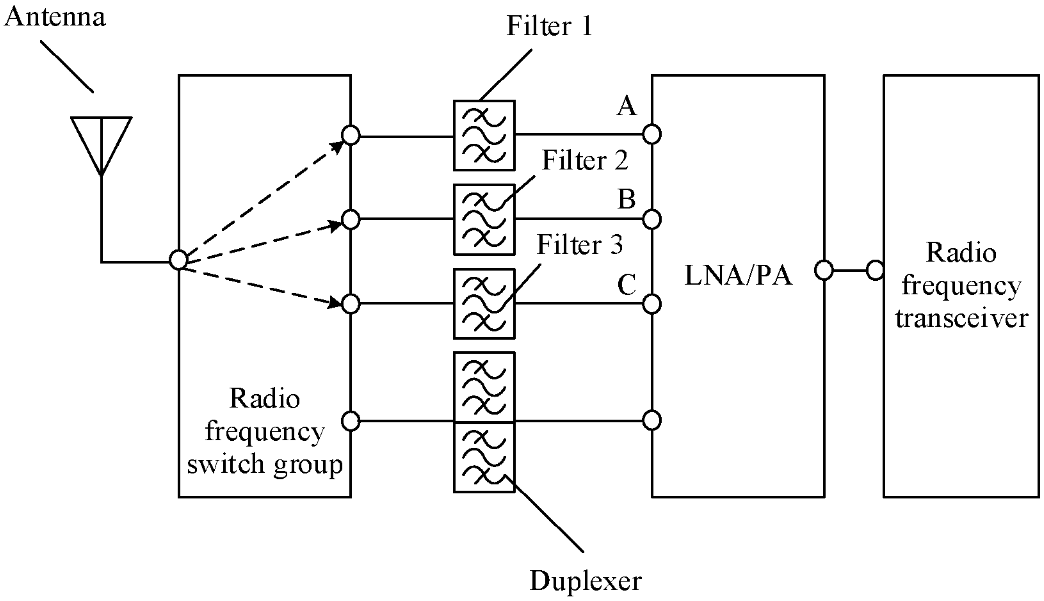
FIG. 2 is a schematic diagram of a circuit of a radio frequency front-end circuit according to an embodiment of this application.

The radio frequency front-end can be divided into a transmit end (transmit, Tx) and a receive end (receive, Rx) based on functions. Based on components, FIG. 2 is a schematic diagram of a partial circuit of a radio frequency front-end circuit. The radio frequency front-end may include a power amplifier (PA)/low frequency noise amplifier (LNA), a filter, a radio frequency switch (SW), a duplexer, and the like. For the receive end, the radio frequency front-end usually includes an amplifier, a filter, a frequency converter, some radio frequency connection and matching circuits, and the like. For the transmit end, the radio frequency front-end usually includes a power amplifier, a filter, and the like.

Functions of the components may be specifically as follows:

(a) The power amplifier is configured to amplify a radio frequency signal on a transmit channel.

(b) The filter is configured to: perform filtering on a transmit signal and a receive signal, to be specific, reserve a signal of a specific frequency band and filter out a signal of another frequency band.

(c) The low noise amplifier is configured to amplify a small signal on the receive channel.

(d) The radio frequency switch can implement switching between different signal channels, including switching between the receive channel and the transmit channel and switching between different frequency bands.

(e) The duplexer is configured to: perform quasi-duplex switching, and perform filtering on radio frequency signals on the receive channel and the transmit channel.

With wide application of multiple-input multiple-output and carrier aggregation technologies and development of 5G technologies, there are more types of communication frequency bands, and more combinations of carrier aggregation performed by using different frequency bands. Therefore, more requirements are imposed on components such as the filter and a multiplexer in the radio frequency front-end.

Figure 3:
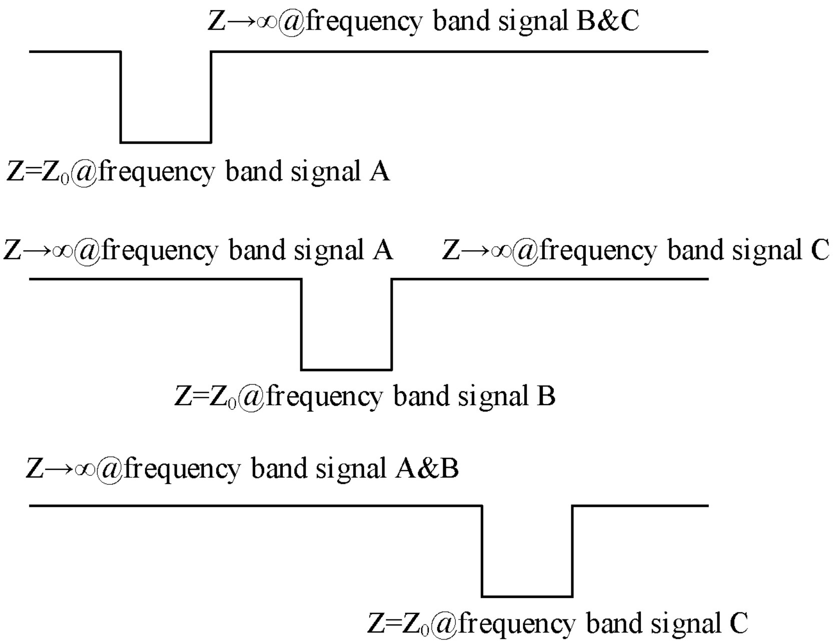
FIG. 3 is a schematic diagram of designs of impedances of different frequency bands according to an embodiment of this application.

As shown in the radio frequency front-end circuit in FIG. 2, it is assumed that a carrier aggregation signal includes three different frequency band signals: a frequency band signal A, a frequency band signal B, and a frequency band signal C. On the receive channel, after the carrier aggregation signal is switched by a switch in a radio frequency switch group, the carrier aggregation signal may be output to a filter 1, a filter 2, and a filter 3, and the carrier aggregation signal is screened by the different filters. For example, to implement simultaneous selection of a plurality of passbands, different impedance requirements may be configured based on impedance designs of the different filters. For example, FIG. 3 is a schematic diagram of designs of impedances of different frequency bands. It is assumed that a frequency of a frequency band signal A<a frequency of a frequency band signal B<a frequency of a frequency band signal C. In an ideal design, when an impedance that is of the filter 1 and that is close to an antenna end is a characteristic impedance ($Z=Z_0$@frequency band signal A) of the frequency band signal A, and characteristic impedances of the frequency band signal B and the frequency band signal C are infinite (open-circuit state, $Z\rightarrow\infty$@frequency band signals B&C), the filter 1 can filter out the frequency band signal B and the frequency band signal C, and the filter 1 outputs a signal of the frequency band signal A to the LNA. Similarly, when an impedance that is of the filter 2 and that is close to the antenna end is the characteristic impedance ($Z=Z_0$@frequency band signal B) of the frequency band signal B, and the characteristic impedances of the frequency band signal A and the frequency band signal C are infinite (open-circuit state, $Z\rightarrow\infty$@frequency band signal A, $Z\rightarrow\infty$@frequency band signal C), the filter 2 can filter out signals of the frequency band signal A and the frequency band signal C, and the filter 2 outputs a signal of the frequency band signal B to the LNA. When an impedance that is of the filter 3 and that is close to the antenna end is the characteristic impedance ($Z=Z_0$@frequency band signal C) of the frequency band signal C, and the characteristic impedances of the frequency band signal A and the frequency band signal B are infinite (open-circuit state, $Z\rightarrow\infty$@frequency band signals A&B), the filter 3 can filter out the signals of the frequency band signal A and the frequency band signal B, and the filter 3 outputs the signal of the frequency band signal C to the LNA.

In an actual circuit, to implement the foregoing filtering function, a phase shifter needs to be added to the radio frequency front-end to cooperate with the filter, to implement filtering. Each radio frequency channel of the radio frequency front-end may include a phase shifter. Generally, main functions of the phase shifter include controlling a beam direction, changing a phase to resist interference, and changing a transmit phase when antennas are transmitted simultaneously in MIMO, to facilitate back-end channel separation. That the phase shifter is configured to change a phase to resist interference may be frequency band screening implemented through cooperation between the phase shifter and the filter on a channel.

Figure 4:
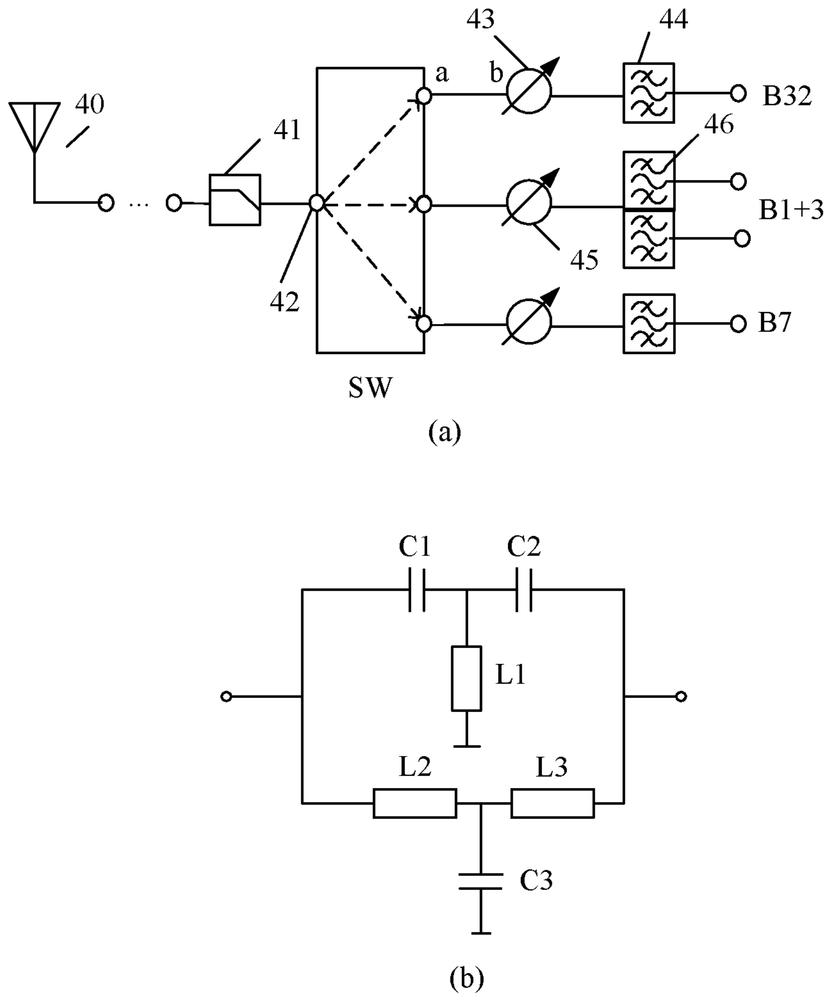
FIG. 4 is a schematic diagram of a partial circuit of a radio frequency front-end circuit according to an embodiment of this application.

For example, (a) in FIG. 4 is a schematic diagram of a partial architecture of a radio frequency front-end, and (b) in FIG. 4 is a schematic diagram of a structure of a phase shifter. A carrier aggregation signal includes signals with B32 (1500 MHz), B1+3 (1.8 GHz to 2.1 GHz), and B7 (2.5 GHz to 2.7 GHz). As shown in (a) in FIG. 4, when an antenna 40 receives a carrier aggregation signal, the carrier aggregation signal may be transmitted to a low-pass filter 41. A high-order harmonic wave of a power amplifier in the radio frequency front-end is suppressed by using the low-pass filter 41, and then the carrier aggregation signal is output to a carrier aggregation impedance combination point 42 of a switch group SW. When the combination point 42 and a branch point a of the SW are conducted, the carrier aggregation signal is output to an input end b of a phase shifter 43. When the phase shifter 43 performs phase-shifting, the filter 44 meets a characteristic impedance of B32, and impedances of B1+3 and B7 are in an open-circuit state, the filter 44 may output the signal with B32. Signal output manners of B1+3 and B7 are similar to that of B32. However, for a phase shifter 45, because a frequency range of B1+3 is between B32 and B7, the phase shifter 45 not only needs to meet that the impedance of B32 is in an open-circuit state, but also needs to meet that the impedance of B7 is in an open-circuit state. In this way, as shown in (b) in FIG. 4, a design of the phase shifter 45 is usually complex, and needs to be implemented by using a plurality of inductors and capacitors. The phase shifter shown in (b) in FIG. 4 includes two T-shaped networks connected in parallel. One T-shaped network includes a capacitor C1, a capacitor C2, and a resistor L1, and the other T-shaped network includes a resistor L2, a resistor L3, and a capacitor C3.

A limitation of a quality factor (Q value) of each component in the phase shifter results in an extra insertion loss. A more complex structure of the phase shifter leads to a larger insertion loss. For example, an insertion loss of the phase shifter shown in (b) in FIG. 4 may be more than 1 dB. Due to the insertion loss, a noise factor of a receive channel may increase, and power consumption of a power amplifier of a transmit channel may increase. In addition, a complex phase shifter may further leads to large area occupation on a substrate and high costs.

Therefore, an embodiment of this application provides a radio frequency front-end circuit, to obtain a phase-shift filter by combining, between two levels of switches, a phase shifter and a filter on a transmit channel or a receive channel. The phase-shift filter can combine a requirement for phase-shifting and a requirement for filtering, and simultaneously implement phase-shifting and filtering. In this way, an insertion loss caused by a complex phase shifter may be reduced by reducing a quantity of components. Especially, for a phase shifter that needs to meet that impedances of frequency ranges of a plurality of frequency bands are in an open-circuit state, in this application, an insertion loss caused by design complexity of the phase shifter can be avoided. In addition, costs and area occupation on a substrate can also be reduced.

The radio frequency front-end circuit provided in this embodiment of this application may be used in a receive channel of a radio frequency front-end, or may be used in a transmit channel of the radio frequency front-end. The following first describes an example in which a circuit architecture is used in the receive channel of the radio frequency front-end.

Figure 5:
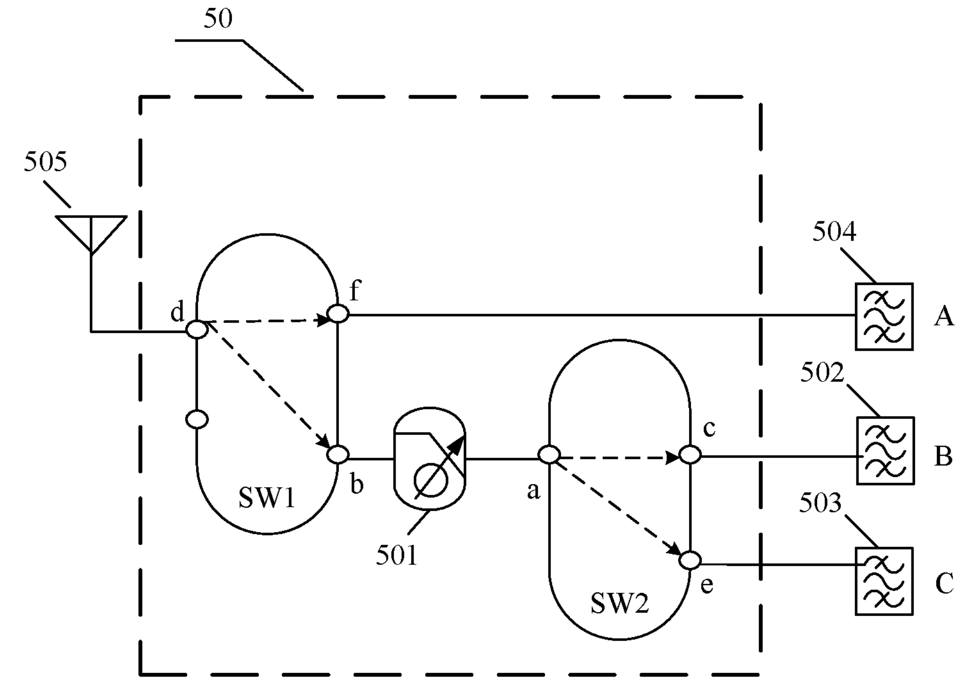
FIG. 5 is a schematic diagram of a partial circuit of a radio frequency front-end circuit according to an embodiment of this application.

Based on this, FIG. 5 is a schematic diagram of a radio frequency front-end circuit 50 according to an embodiment of this application. The radio frequency front-end circuit 50 includes the following circuit architecture.

A first switch group SW1 includes a first output end f and a second output end b, where the first switch group SW1 is configured to selectively transmit, to the first output end f and the second output end b, a carrier aggregation signal received from an antenna 505, where the carrier aggregation signal includes at least a first frequency band signal A, a second frequency band signal B, and a third frequency band signal C that are aggregated. The antenna 505 is coupled to a first input end d of the first switch group SW1.

The first output end f is coupled to a first filter 504, and the first filter 504 is configured to: perform filtering on the carrier aggregation signal, and output the first frequency band signal A. It is equivalent to that the first filter 504 filters out/blocks the second frequency band signal B and the third frequency band signal C from passing through.

A phase-shift filter 501 is coupled to the second output end b, and is configured to: perform phase-shifting and filtering on the carrier aggregation signal, and output a phase-shifted filtered signal, where the phase-shifted filtered signal includes the second frequency band signal B and the third frequency band signal C. In other words, the phase-shift filter 501 filters out/blocks the first frequency band signal A.

A second switch group SW2 is coupled to the phase-shift filter 501, where the second switch group SW2 includes at least one third output end, and each third output end is configured to output the phase-shifted filtered signal. For example, it is assumed that the at least one third output end includes a third output end c and a third output end e, the third output end c may output the phase-shifted filtered signal to a second filter 502, and the third output end e may output the phase-shifted filtered signal to a third filter 503.

The at least one third output end is coupled to the second filter 502 and the third filter 503, and the second filter 502 and the third filter 503 are configured to: separately perform filtering on the phase-shifted filtered signal, and respectively output the second frequency band signal B and the third frequency band signal C. As shown in FIG. 5, the second filter 502 is coupled to the third output end c, and the third filter 503 is coupled to the third output end e. The second filter 502 may be configured to: filter out the third frequency band signal C, and output the second frequency band signal B, and the third filter 503 may be configured to: filter out the second frequency band signal B, and output the third frequency band signal C.

For example, generally, a low-pass filter may be configured to suppress a high-order harmonic wave of the power amplifier overall, and the phase shifter can adjust a phase of a wave. In a case in which a frequency range of the first frequency band signal A is greater than a frequency range of the second frequency band signal B and a frequency range of the third frequency band signal C, the phase-shift filter 501 in this application may be configured to suppress the high-order harmonic wave, and may also perform phase adjustment, to suppress signals of some frequency bands, and enable the signals of some frequency bands to pass through. In other words, the phase-shift filter 501 may include functions of the low-pass filter and the phase shifter. In this application, the phase-shift filter 501 may be configured to: perform phase-shifting on the first frequency band signal A, and filter out the first frequency band signal A.

In some embodiments, after the phase-shift filter 501 performs phase-shifting on the first frequency band signal A, and an impedance of the frequency range of the first frequency band signal A is in a high impedance state in the phase-shift filter 501, the first frequency band signal A may be filtered out. In this way, the phase-shift filter 501 may suppress passing through of the first frequency band signal A, and the second frequency band signal B and the third frequency band signal C can pass through.

The first switch group SW1 and the second switch group SW2 may be single-pole single-throw switch groups, or may be single-pole multi-throw switch groups, or may be switch groups of another type. This is not limited in this application.

In this way, if a phase shifter between the filter 502 and the output end c of the second switch group SW2 is omitted, a function of the phase shifter may be implemented by using the phase-shift filter 501. When the phase-shift filter 501 suppresses the first frequency band signal A in the carrier aggregation signal, the second frequency band signal B and the third frequency band signal C in the carrier aggregation signal are output to a first input end a of the second switch group SW2 after passing through. If the first input end a of the second switch group SW2 and the third output end c of the second switch group SW2 are conducted, the second filter 502 coupled to the third output end c may perform filtering on received signals of at least two frequency bands. When a characteristic impedance of the second filter 502 meets an output impedance of the second frequency band signal, the second filter 502 may be used to: filter out the third frequency band signal C, and output the second frequency band signal B. In this way, it is assumed that the frequency range of the second frequency band signal B is between the frequency range of the first frequency band signal A and the frequency range of the third frequency band signal C, on a basis that a phase shifter between the third output end c and the second filter B is omitted, design complexity caused by a fact that the phase shifter in the conventional technology needs to perform phase-shifting on the first frequency band signal A and the third frequency band signal C to enable impedances of the first frequency band signal A and the third frequency band signal C to be in an open-circuit state can be avoided, and an insertion loss and an area on a substrate that are generated by the phase shifter can be avoided.

Therefore, compared with that in a conventional solution, in the radio frequency front-end circuit 50 provided in this application, a phase shifter between the second switch group SW2 and the filter can be reduced, to reduce a link insertion loss, costs, and an area on a substrate that are caused by the phase shifter. In this way, on a basis of reducing the link insertion loss, efficiency of the transmit channel of the radio frequency front-end can be improved, a circuit noise factor of the receive channel can be reduced, and overall performance of a circuit architecture of the radio frequency front-end can be improved.

It may be understood that, the radio frequency front-end circuit 50 shown in FIG. 5 in this application may support processing on the carrier aggregation signal (A+B+C) of three frequency band signals, to separately output the first frequency band signal A, the second frequency band signal B, and the third frequency band signal C after separately isolating the three frequency band signals.

It should be noted that, in some other embodiments, a person skilled in the art can also easily think of that, when the first switch group SW1 receives the carrier aggregation signal (A+B+C) of the three frequency bands, due to a software configuration in a communication apparatus in which the radio frequency front-end circuit 50 is located, the first input end d and the second output end b of the first switch group SW1 may be conducted, and the first input end d and the first output end f of the first switch group SW1 cannot be conducted. In this case, the first filter 504 does not operate. However, due to the function of the phase-shift filter 501 described above, the phase-shift filter 501 may still block the first frequency band signal A from passing through, and output, to the second switch group SW2, the phase-shifted filtered signal including the second frequency band signal B and the third frequency band signal C.

Moreover, in some other embodiments, the radio frequency front-end circuit 50 may also be used in receiving a carrier aggregation signal of two frequency band signals, for example, a carrier aggregation signal (B+C), and separately outputting the second frequency band signal B and the third frequency band signal C after isolating the carrier aggregation signal of each of the two frequency bands. In this case, due to a software configuration in a communication apparatus in which the radio frequency front-end circuit 50 is located, the first input end d and the second output end b of the first switch group SW1 may be conducted, and the first input end d and the first output end f of the first switch group SW1 are not conducted. When the first input end d and the second output end b of the first switch group SW1 are conducted, the phase-shift filter 501 may also perform phase-shifting on the carrier aggregation signal (B+C), where an impedance of a phase-shifted filtered signal (B+C) obtained through phase-shifting is a characteristic impedance of the phase-shift filter 501, and the phase-shift filter 501 may output the phase-shifted filtered signal (B+C) to the first input end a of the second switch group SW2. Alternatively, the phase-shift filter 501 may not operate, but directly output the carrier aggregation signal (B+C) to the second switch group SW2. In this way, when ports of the second switch group SW2 are conducted in a time-division manner, the second filter 502 may be used to: filter out the third frequency band signal C, and output the second frequency band signal B, and the third filter 503 may be used to: filter out the second frequency band signal B, and output the third frequency band signal C.

Similarly, the carrier aggregation signal (B+C) of the two frequency band signals may alternatively be replaced with a carrier aggregation signal (A+C) or a carrier aggregation signal (A+B).

Figure 6:
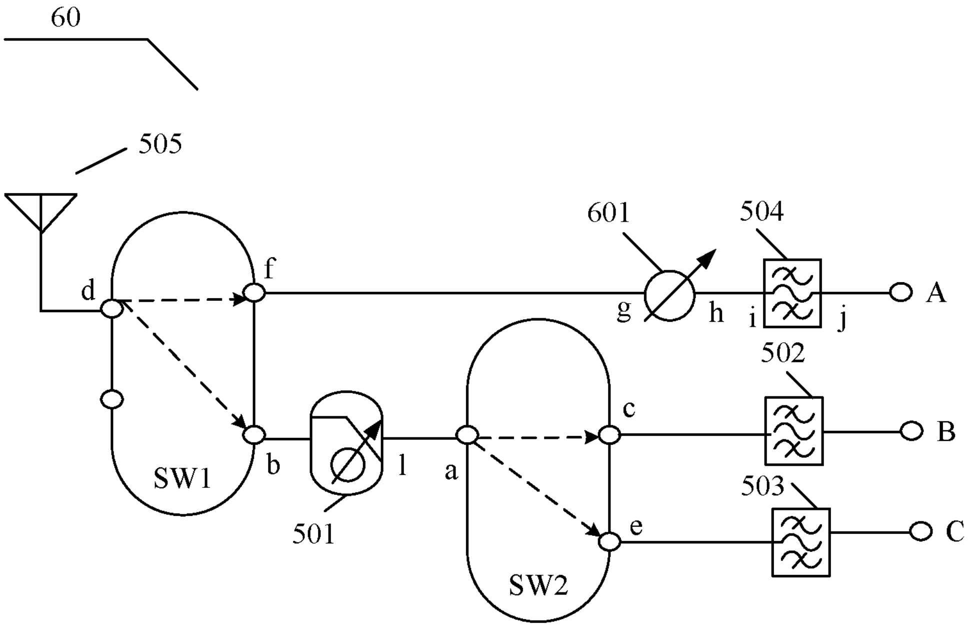
FIG. 6 is a schematic diagram of a partial circuit of a radio frequency front-end circuit according to an embodiment of this application.

In some embodiments, based on the radio frequency front-end circuit 50 shown in FIG. 5, FIG. 6 is a schematic diagram of a structure of a radio frequency front-end circuit 50. Based on FIG. 5, the radio frequency front-end circuit 50 further includes the first filter 504 and a first phase shifter 601. The first phase shifter 601 is coupled between the first output end f and the first filter 504. The first phase shifter 601 is configured to perform phase-shifting on the second frequency band signal B and the third frequency band signal C, and after phase-shifting, impedances of frequency ranges of the second frequency band signal B and the third frequency band signal C are in a high impedance state in the first filter 504. The first output end f of the first switch group SW1 is coupled to an input end g of the first phase shifter 601, an output end h of the first phase shifter 601 is coupled to an input end i of the first filter 504, and an output endj of the first filter 504 may output the first frequency band signal A.

The circuit architecture shown in FIG. 6 is used as an example. For example, it is assumed that the carrier aggregation signal is BandA+B+C, which indicates carrier aggregation of the first frequency band signal A, the second frequency band signal B, and the third frequency band signal C. When the antenna 505 receives the carrier aggregation signal BandA+B+C and transmits the carrier aggregation signal BandA+B+C to the first input end d of the first switch group SW1, if the first input end d and the first output end f of the first switch group SW1 are conducted, the carrier aggregation signal BandA+B+C may be output to the input end g of the first phase shifter 601. The first phase shifter 601 performs phase-shifting on the first frequency band signal A, where an impedance of a frequency range after phase-shifting is a characteristic impedance of the first filter 504; and performs phase-shifting on the second frequency band signal B and the third frequency band signal C, where impedances of frequency ranges after phase-shifting are in a high impedance state in the first filter 504. In this way, the first frequency band signal A may pass through the first phase shifter 601 and the first filter 504. The first phase shifter 601 and the first filter 504 may implement total reflection of signals of the second frequency band signal B and the third frequency band signal C, and block the second frequency band signal B and the third frequency band signal C from passing through, or suppress passing through of the second frequency band signal B and the third frequency band signal C, and the first frequency band signal A is output through the output end j of the first filter 504.

In some embodiments, the radio frequency front-end circuit 50 further includes the second filter 502 and the third filter 503. When there are a plurality of third output ends, the second filter 502 and the third filter 503 are separately coupled to one of the third output ends.

The second filter 502 is configured to: filter out the third frequency band signal C from the phase-shifted filtered signal, and output the second frequency band signal B.

The third filter 503 is configured to: filter out the second frequency band signal B from the phase-shifted filtered signal, and output the third frequency band signal C.

In this way, based on the phase-shift filter 501 provided in this application, if the first input end a and the third output end c of the second switch group SW2 are conducted, the second filter 502 needs to filter out only the third frequency band signal C, that is, when the characteristic impedance of the second filter 502 meets the output impedance of the second frequency band signal B, and the impedance of the frequency range of the third frequency band signal C after phase-shifting performed by the phase-shift filter 501 is in a high impedance state in the second filter 502, the second filter 502 may block the third frequency band signal C and output the second frequency band signal B.

If the first input end a of the second switch group SW2 and the third output end e of the second switch group SW2 are conducted, the third filter 503 needs to filter out only the second frequency band signal B, that is, when a characteristic impedance of the third filter 503 meets an output impedance of the third frequency band signal C, and the impedance of the frequency range of the second frequency band signal B after the phase-shift filter performs phase-shifting is in a high impedance state in the third filter 503, the third filter 503 may output the third frequency band signal C.

For example, if the first input end d and the second output end b of the first switch group SW1 are conducted, the carrier aggregation signal BandA+B+C may be output to the input end of the phase-shift filter 501. When the phase-shift filter 501 performs phase-shifting on the first frequency band signal A, and the impedance of the frequency range of the first frequency band signal A after phase-shifting is in a high impedance state in the phase-shift filter 501, the first frequency band signal A may be totally reflected, that is, the phase-shift filter 501 can block the first frequency band signal A, only the phase-shifted filtered signal BandB+C can pass through the phase-shift filter 501, and the phase-shifted filtered signal BandB+C is output to the first input end a of the second switch group SW2 through an output end 1 of the phase-shift filter 501. If the first input end a of the second switch group SW2 and the third output end c of the second switch group SW2 are conducted, the phase-shifted filtered signal BandB+C is output to the first output end a of the second switch group SW2, and then is output to the second filter 502 through the third output end c of the second switch group SW2. It is assumed that an impedance of the second filter 502 is the characteristic impedance in the frequency range of the second frequency band signal B, and is in a high impedance state in the frequency range of the third frequency band signal C. Therefore, the second filter 502 may implement total reflection of the third frequency band signal C, to enable the second frequency band signal B to pass through. If the second frequency band signal B is a time division duplexing (TDD) signal, the second filter 502 may be a single frequency band filter; or if the second frequency band signal B is a frequency division duplexing signal, the second filter 502 may be a frequency band duplexer. In this case, it is equivalent to that the phase-shift filter 501 also has a function of a phase shifter coupled to the second filter 502 in a conventional solution.

Similarly, if the first input end a and the third output end e of the second switch group SW2 are conducted, the phase-shifted filtered signal BandB+C is output to the third output end e of the second switch group SW2, and then is output to the third filter 503 through the third output end e of the second switch group SW2. It is assumed that an impedance of the third filter 503 is a characteristic impedance in the frequency range of the third frequency band signal C, and is in a high impedance state in the frequency range of the second frequency band signal B. Therefore, the third filter 503 may implement total reflection of the second frequency band signal B, to enable the third frequency band signal C to pass through. In this case, it is equivalent to that the phase-shift filter 501 has both a filtering function and a function of a phase shifter coupled to the third filter 503.

Alternatively, in some embodiments, the phase-shift filter 501 has a filtering function, a function of a phase shifter coupled to the second filter 502, and a function of a phase shifter coupled to the third filter 503.

In this way, the phase shifter coupled to the second filter 502 and the phase shifter coupled to the third filter 503 in the conventional solution can be omitted, to reduce the insertion loss and the area on a substrate that are caused by the phase shifter.

The phase-shift filter 501 in this application may be used in a plurality of radio frequency front-end circuit scenarios. The following describes an application scenario of the phase-shift filter 501 by using an example.

Figure 7A:
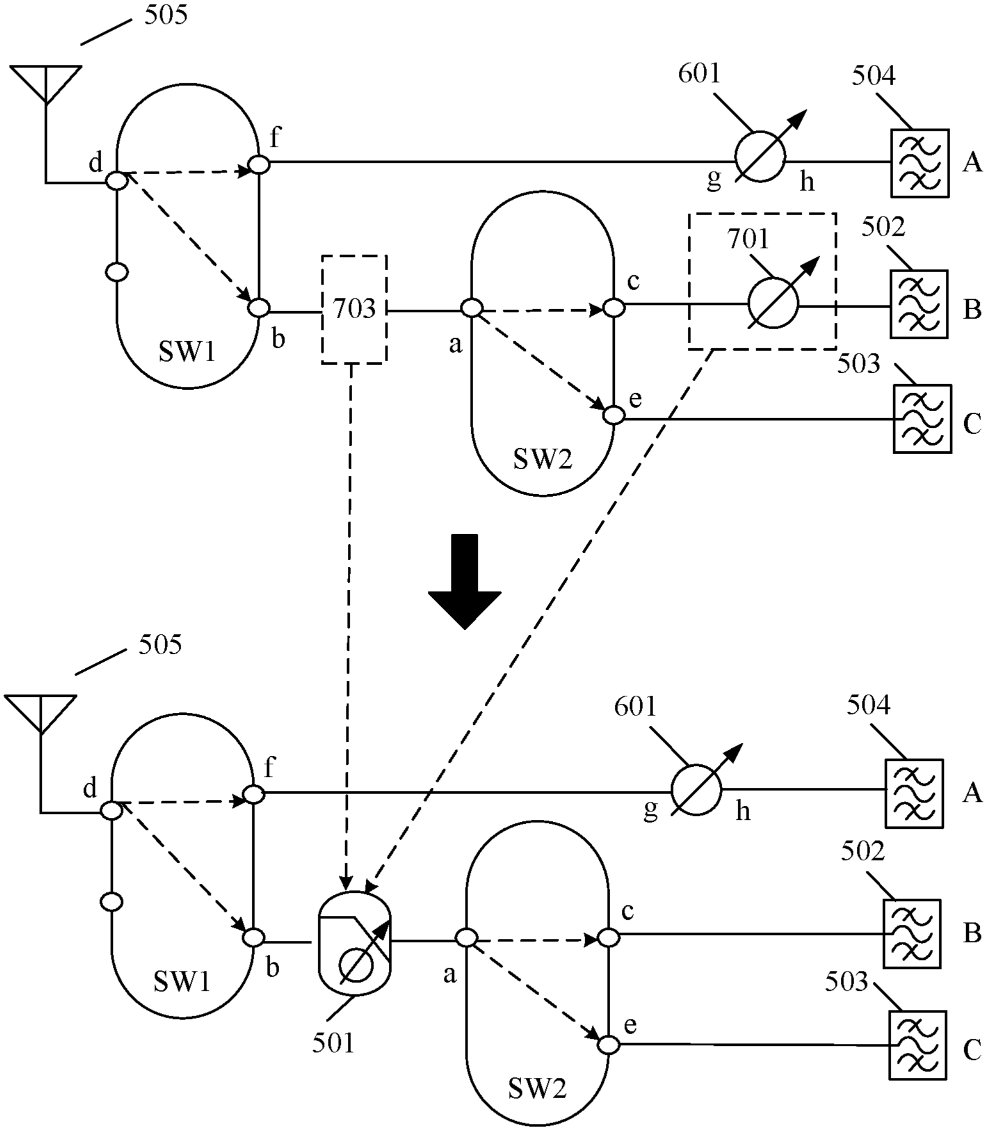
FIG. 7(*a*), FIG. 7(*b*), and FIG. 7(*c*) are a schematic diagram in which partial structures of three conventional radio frequency front-end circuits are changed to a partial circuit of a radio frequency front-end circuit in this application according to an embodiment of this application.
Figure 7B:
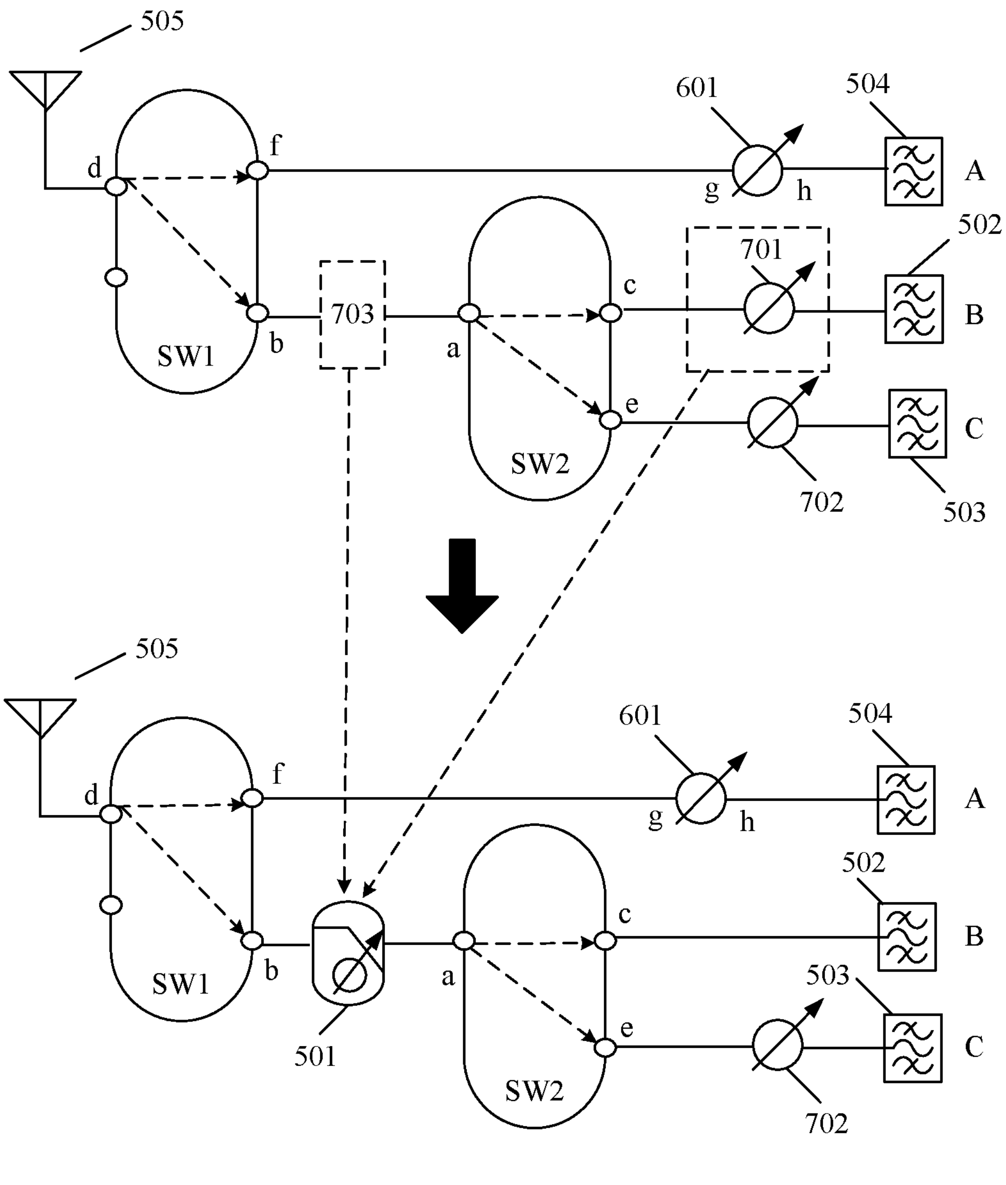
Figure 7C:
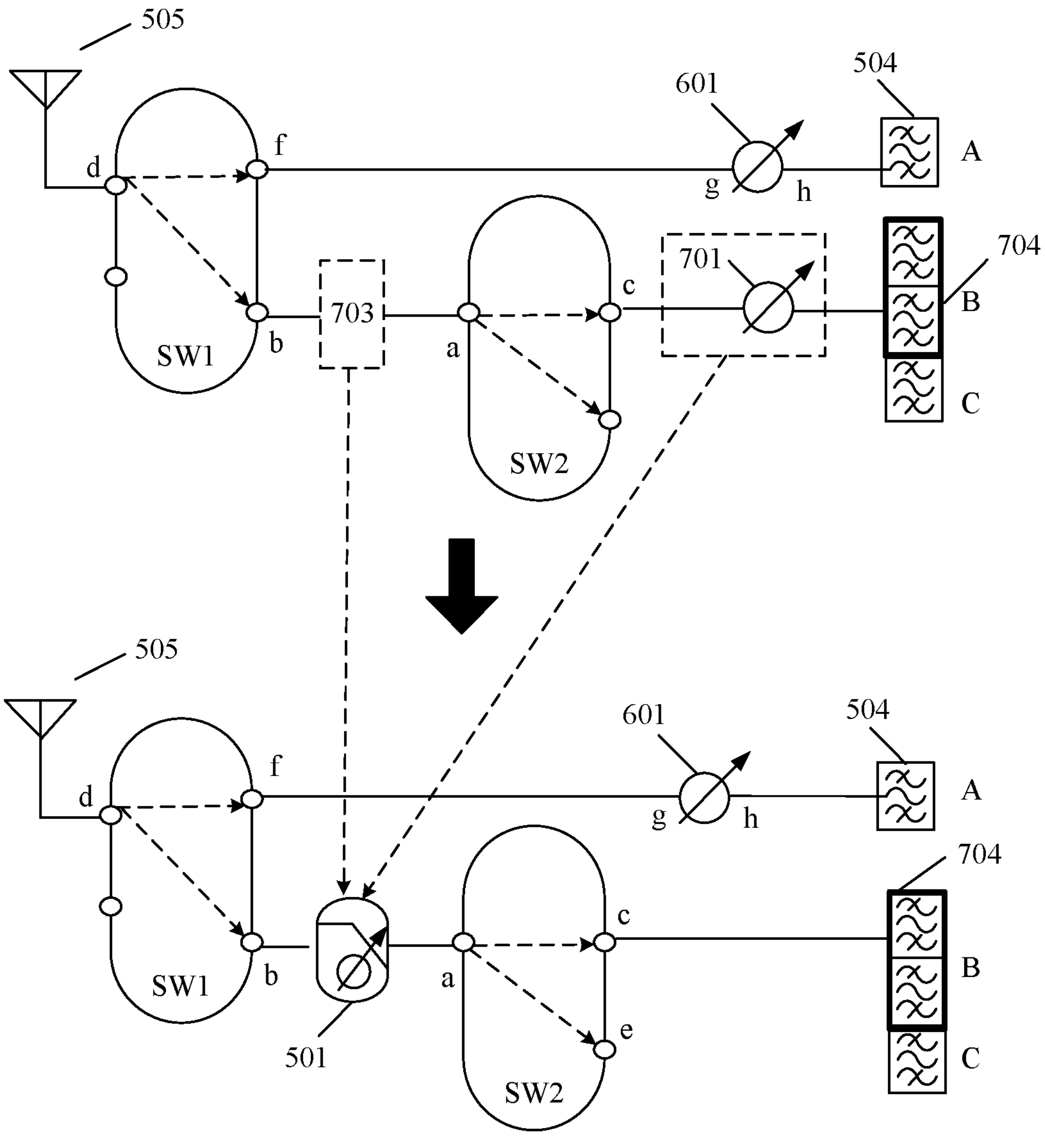

For example, as shown in FIG. 7(*a*), FIG. 7(*a*) is a schematic diagram in which a partial structure of a conventional radio frequency front-end is changed to a partial structure of a radio frequency front-end in this application. In the partial structure of the conventional radio frequency front-end, the third output end c of the second switch group SW2 is coupled to the second filter 502 through a phase shifter 701. In this application, a requirement for the phase shifter 701 may be combined with a requirement for a filter 703 between the first switch group SW1 and the second switch group SW2, to obtain the phase-shift filter 501 shown in FIG. 5, so as to reduce a component insertion loss caused by the phase shifter 701, and reduce area occupation on a substrate and costs. The phase-shift filter 501 has functions of both the phase shifter 701 and the filter 703.

In some embodiments, as shown in FIG. 7(*b*), the radio frequency front-end circuit 50 further includes a second phase shifter 702. The second phase shifter 702 is coupled between the third filter 503 and the third output end e corresponding to the third filter 503, and is configured to perform phase-shifting on the second frequency band signal B, and after phase-shifting, the impedance of the frequency range of the second frequency band signal B is in a high impedance state in the third filter 503. The frequency range of the second frequency band signal B output by the second filter 502 is between the frequency range of the first frequency band signal A and the frequency range of the third frequency band signal C. In this way, it is equivalent to that after receiving the phase-shifted filtered signal, the third filter 503 may block the second frequency band signal B from passing through and allow the third frequency band signal C to pass through.

For example, as shown in FIG. 7(*b*), FIG. 7(*b*) is a schematic diagram in which a partial structure of a conventional radio frequency front-end is changed to a partial structure of a radio frequency front-end in this application. In the partial structure of the conventional radio frequency front-end, the third output end c of the second switch group SW2 is coupled to the second filter 502 and the like through a phase shifter 701, and the third output end e of the second switch group SW2 is coupled to the third filter 503 and the like through a second phase shifter 702. In this application, a requirement for the phase shifter 701 coupled between the third output end c and the second filter 502 may be combined with a requirement for a filter 703 between the first switch group SW1 and the second switch group SW2, to obtain the phase-shift filter 501 shown in FIG. 5, so as to reduce a component insertion loss caused by the phase shifter 701 due to meeting a requirement that the impedances of the frequency ranges of the first frequency band signal A and the third frequency band signal C need to be in a high impedance state, and reduce area occupation on a substrate and costs. The phase-shift filter 501 has functions of both the phase shifter 701 and the filter 703.

Alternatively, in this application, requirements for the phase shifter 701 coupled between the third output end c and the second filter 502 and the second phase shifter 702 coupled between the third output end e and the third filter 503 may be combined with a requirement for a filter 703 between the first switch group SW1 and the second switch group SW2, to obtain the phase-shift filter 501 shown in FIG. 5, so as to reduce a component insertion loss caused by the phase shifter 701 and the second phase shifter 702, and reduce area occupation on a substrate and costs. The phase-shift filter 501 has functions of all the phase shifter 701, the second phase shifter 702, and the filter 703.

In some embodiments, when the second filter 502 and the third filter 503 are coupled to a same third output end, the second filter 502 and the third filter 503 may be two filters in a multiplexer.

For example, as shown in FIG. 7(*c*), FIG. 7(*c*) is a schematic diagram in which a partial structure of a conventional radio frequency front-end is changed to a partial structure of a radio frequency front-end in this application. In the partial structure of the conventional radio frequency front-end, the third output end c of the second switch group SW2 is coupled to a multiplexer 704 (a triplexer is used as an example) through a phase shifter 701. In this application, the requirement for the phase shifter 701 may be combined with the requirement for the filter 703 between the first switch group SW1 and the second switch group SW2, to obtain the phase-shift filter 501 shown in FIG. 5, so as to reduce the component insertion loss caused by the phase shifter 701, and reduce the area occupation on a substrate and costs. The phase-shift filter 501 has functions of both the phase shifter 701 and the filter 703.

In a case in which the multiplexer 704 is a triplexer, the multiplexer 704 may output the second frequency band signal B and the third frequency band signal C existing after isolating. In a case in which the second frequency band signal B includes two band frequency signals, the multiplexer 704 may isolate the two frequency band signals of the second frequency band signal B and output the two frequency band signals. In this way, when the phase shifter 701 is omitted, an insertion loss and an area on a substrate that are caused by phase shifter 701 can be avoided.

For example, in a case in which the carrier aggregation signal is obtained by aggregating the first frequency band signal A, the second frequency band signal B, and the third frequency band signal C, when the first input end d of the first switch group SW1 and the first output end f of the first switch group SW1 are conducted, the first phase shifter 601 may perform phase-shifting to enable the impedances of the frequency ranges of the second frequency band signal B and the third frequency band signal C to be in a high impedance state, and the first filter 504 outputs the first frequency band signal A. When the first input end d of the first switch group SW1 and the second output end b of the first switch group SW1 are conducted, under an action of the phase-shift filter 501, the phase-shift filter 501 may totally reflect the signal of the first frequency band signal A, so that the phase-shift filter 501 outputs, to the first input end a of the second switch group SW2, the phase-shifted filtered signal including the second frequency band signal B and the third frequency band signal C. When the first input end of the second switch group SW2 and the third output end c of the second switch group SW2 are conducted, the phase-shifted filtered signal may be sent to the multiplexer 704 through the third output end c of the second switch group SW2, and the multiplexer

704 performs filtering. A duplexer in the multiplexer 704 outputs the second frequency band signal B (including the signals of the two frequency bands), and the filter outputs the third frequency band signal C.

Certainly, the phase-shift filter 501 provided in this application may alternatively be obtained by combining requirements of a filter and a phase shifter in a plurality of other scenarios. This is not limited in this application.

In some embodiments, for information indicating that the frequency range of the second frequency band signal B output by the second filter 502 is between the frequency range of the first frequency band signal A and the frequency range of the third frequency band signal C, possible cases are as follows: With reference to the descriptions in FIG. 5 to FIG. 7(*a*), FIG. 7(*b*), and FIG. 7(*c*), the frequency range of the first frequency band signal A is greater than the frequency range of the second frequency band signal B, and the frequency range of the second frequency band signal B is greater than the frequency range of the third frequency band signal C.

Alternatively, the frequency range of the first frequency band signal A is smaller than the frequency range of the second frequency band signal B, and the frequency range of the second frequency band signal B is smaller than the frequency range of the third frequency band signal C.

In other words, when the carrier aggregation signal aggregates three frequency bands, a frequency band with a lowest frequency among the three frequency bands may be independently filtered and output on a radio frequency channel that is not coupled to the phase-shift filter 501. For example, when the frequency of the first frequency band signal A is the lowest, the first frequency band signal A may be phase-shifted and filtered and then output through the first phase shifter 601 and the first filter 504. In this way, the first phase shifter 601 and the first filter 504 only need to consider a phase threshold and a characteristic impedance parameter of the first frequency band signal A, and set a characteristic impedance of a frequency band higher than the frequency range of the first frequency band signal A to be at the open-circuit point or be close to infinite, so that an implementation of the first phase shifter 601 and the first filter 504 is simple.

Alternatively, a frequency band with a highest frequency among the three frequency bands may be independently filtered and output on a radio frequency channel that is not coupled to the phase-shift filter 501. For example, when the frequency of the first frequency band signal A is the highest, the first frequency band signal A may be phase-shifted and filtered and then output through the first phase shifter 601 and the first filter 504. In this way, the first phase shifter 601 and the first filter 504 also only need to consider a phase threshold and a characteristic impedance parameter of the first frequency band signal A, and set a characteristic impedance of a frequency band lower than the frequency range of the first frequency band signal A to be at the open-circuit point or infinite, so that an implementation of the first phase shifter 601 and the first filter 504 is simple.

In some embodiments, when the carrier aggregation signal is an aggregation signal of more than three frequency bands, the radio frequency front-end circuit 50 in this application may also include two or more phase-shift filters.

Figure 8:
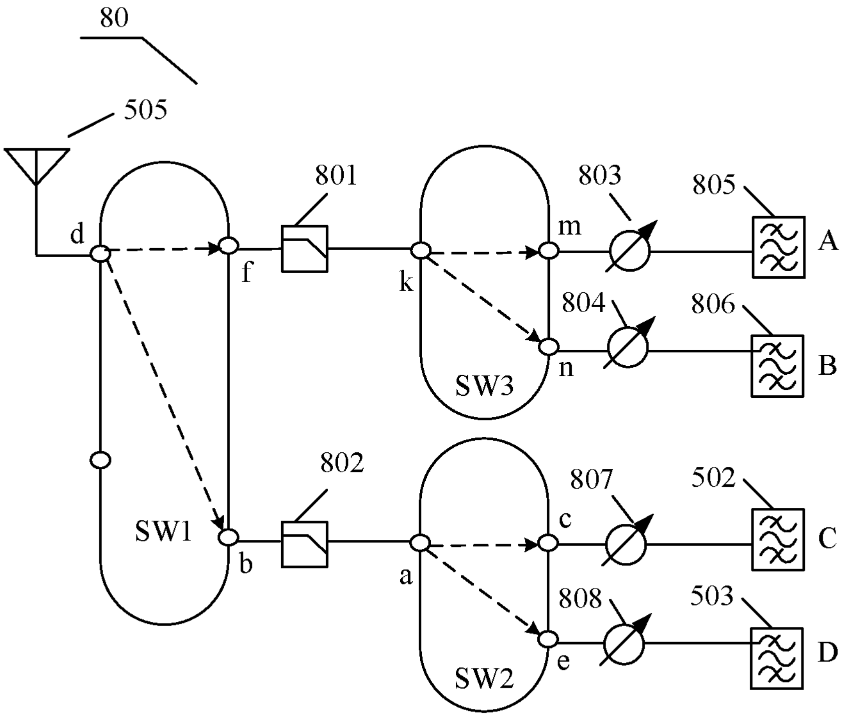
FIG. 8 is a schematic diagram in which a partial structure of a conventional radio frequency front-end circuit is changed to a partial circuit of a radio frequency front-end circuit in this application according to an embodiment of this application.
Figure 8:
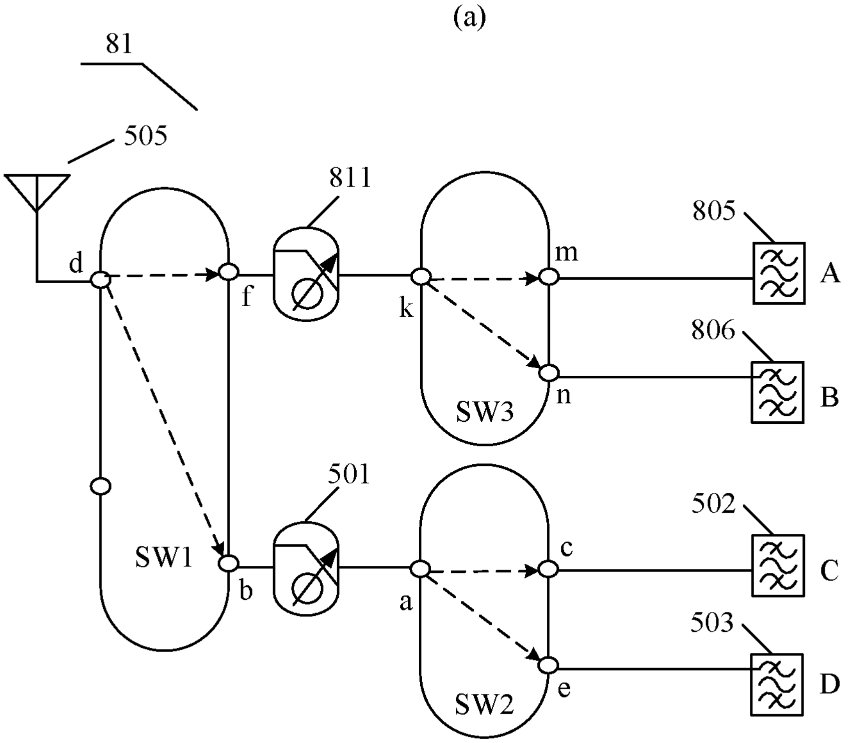

For example, (a) in FIG. 8 is a schematic diagram of a component architecture of a conventional radio frequency front-end circuit. For example, the carrier aggregation signal received by the antenna 505 is a signal obtained by aggregating the frequency band signal A, the frequency band signal B, the frequency band signal C, and a frequency band signal D, where the output terminal f of the first switch group SW1 is coupled to the third switch group SW3 through a filter 801, and an output terminal m of a third switch group SW3 is coupled to a filter 805 through the phase shifter 803, so that the frequency band signal A can be output. An output end n of the third switch group SW3 is coupled to a filter 806 through a phase shifter 804, so that the frequency band signal B can be output. The output end b of the first switch group SW1 is coupled to the second switch group SW2 through a filter 802, the output end c of the second switch group SW2 is coupled to the filter 502 through a phase shifter 807, so that the frequency band signal C can be output, and the output end e of the second switch group SW2 is coupled to the filter 503 through a phase shifter 808, so that the frequency band signal D can be output.

According to a solution of the phase-shift filter provided in this application, a partial structure of a radio frequency front-end circuit 80 shown in (a) in FIG. 8 may be evolved into a partial structure of a radio frequency front-end circuit 81 shown in (b) in FIG. 8. In other words, functions of the phase shifter 803, the phase shifter 804, and the filter 801 shown in (a) in FIG. 8 may be combined, to obtain a phase-shift filter 811, and functions of the phase shifter 807, the phase shifter 808, and the filter 802 may be combined, to obtain the phase-shift filter 501.

In this way, when the input end d and the output end b of the first switch group SW1 are conducted, the phase-shift filter 501 performs phase-shifting and filtering, to obtain a first phase-shifted filtered signal, where the first phase-shifted filtered signal includes the frequency band signal C and the frequency band signal D. In other words, after the phase-shift filter 501 performs phase-shifting, an impedance of a frequency range of the first phase-shifted filtered signal is a characteristic impedance of the phase-shift filter 501, and the impedances of the frequency ranges of the frequency band signal A and the frequency band signal B are in a high impedance state in the phase-shift filter 501, so that the signals of the frequency band signal A and the frequency band signal B are totally reflected, the first phase-shifted filtered signal passes through the phase-shift filter 501, and the phase-shift filter 501 outputs the first phase-shifted filtered signal to the input end a of the second switch group SW2. When the input end a and the output end c of the second switch group SW2 are conducted, the first phase-shifted filtered signal is input to the second filter 502. After the phase-shift filter 501 performs phase-shifting on the frequency band signal C and the frequency band signal D, an impedance of the second filter 502 is the impedance in the frequency range of the frequency band signal C, and an impedance of a frequency range of the frequency band signal D is in a high impedance state in the second filter 502, so that the signal of the frequency band signal D can be totally reflected, to enable the frequency band signal C to pass through. When the input end a and the output end e of the second switch group SW2 are conducted, the first phase-shifted filtered signal is input to the third filter 503. After the phase-shift filter 501 performs phase-shifting on the first phase-shifted filtered signal, an impedance of the third filter 503 is the impedance in the frequency range of the frequency band signal D, and the impedance of the frequency range of the frequency band signal C is in a high impedance state, so that the third filter 503 can totally reflect the signal of the frequency band signal C, to enable the frequency band signal D to pass through.

Similarly, when the input end d and the output end f of the first switch group SW1 are conducted, the phase-shift filter 811 performs phase-shifting and filtering, to output a second phase-shifted filtered signal, where the second phase-shifted filtered signal includes the frequency band signal A and the frequency band signal B. In other words, after the phase-shift filter 811 performs phase-shifting, an impedance of a frequency range of the second phase-shifted filtered signal is a characteristic impedance of the phase-shift filter 811, and the impedances of the frequency ranges of the frequency band signal C and the frequency band signal D are in a high impedance state in the phase-shift filter 811, so that the signals of the frequency band signal C and the frequency band signal D are totally reflected, the second phase-shifted filtered signal passes through the phase-shift filter 811, and the phase-shift filter 811 outputs the second phase-shifted filtered signal to an input end k of the third switch group SW3. When the input end k and the output end m of the third switch group SW3 are conducted, the second phase-shifted filtered signal is input to the filter 805. After the phase-shift filter 811 performs phase-shifting on the frequency band signal A and the frequency band signal B, an impedance of the filter 805 is the impedance in the frequency range of the frequency band signal A, and the impedance of the frequency range of the frequency band signal B is in a high impedance state in the filter 805, so that the signal of the frequency band signal B can be totally reflected, to enable the frequency band signal A to pass through. When the input end k and the output end n of the third switch group SW3 are conducted, the second phase-shifted filtered signal is input to the filter 806. After the phase-shift filter 811 performs phase-shifting on the second phase-shifted filtered signal, an impedance of the filter 806 is the impedance in the frequency range of the frequency band signal B, and the impedance of the frequency range of the frequency band signal A is in a high impedance state, so that the filter 806 can totally reflect the signal of the frequency band signal A, to enable the frequency band signal B to pass through.

In this way, on the basis that four frequency band signals are aggregated into a carrier aggregation signal, when more frequencies are aggregated into carrier aggregation combinations, the method provided in this application may be used to further flexibly split and receive a plurality of frequency bands, that is, when functions of a filter and a phase shifter are combined, signals of more carrier aggregation combinations are received, and flexibility is high. This application is not limited to signal receiving of the carrier aggregation combination in the examples.

Similar to that in the foregoing embodiment, in the examples in FIG. 8, the frequency range of the frequency band signal A may be smaller than the frequency range of the frequency band signal B, the frequency range of the frequency band signal B may be smaller than the frequency range of the frequency band signal C, and the frequency range of the frequency band signal C may be smaller than the frequency range of the frequency band signal D. Alternatively, the frequency range of the frequency band signal A may be greater than the frequency range of the frequency band signal B, the frequency range of the frequency band signal B may be greater than the frequency range of the frequency band signal C, and the frequency range of the frequency band signal C may be greater than the frequency range of the frequency band signal D.

In some embodiments of this application, the phase-shift filter 501 may include a function of a phase shifter and a function of a low-pass filter, so that the low-pass filter also has a phase-shifting function, to reduce an insertion loss and a component area that are caused by the phase shifter.

In some embodiments, the phase-shift filter 501 may include a function of a phase shifter and a function of a band-pass filter. For example, in the circuit architecture shown in FIG. 6, when the phase-shift filter 501 also has the function of a band-pass filter, a passband covers the second frequency band signal B and the third frequency band signal C, and the phase-shift filter 501 may block the first frequency band signal A from passing through, to enable the second frequency band signal B and the third frequency band signal C to pass through.

In some embodiments, the phase-shift filter 501 may include a function of a phase shifter, a function of a low-pass filter, and a function of a band-rejection filter. For example, in the circuit architecture shown in FIG. 6, when the phase-shift filter 501 has the functions of both the low-pass filter and the band-rejection filter, the band-rejection filter may block the first frequency band signal A, and the phase-shift filter 501 may suppress passing through of the first frequency band signal A, to enable the first frequency band signal B and the first frequency band signal C to pass through. The band-rejection filter may be, for example, a wave-trap.

An implementation of a filtering function in the phase-shift filter 501 is not limited in this application, and is not limited to the foregoing low-pass filter, band-pass filter, band-rejection filter, and the like.

In some embodiments, a specific circuit design of the phase-shift filter 501 is not limited in this application. Generally, the low-pass filter has a phase-shifting function. In this application, when both the phase-shifting function and a low-pass filtering function need to be designed, a component ratio in the low-pass filter may be adjusted, so that the adjusted low-pass filter also has the phase-shifting function.

Figure 9:
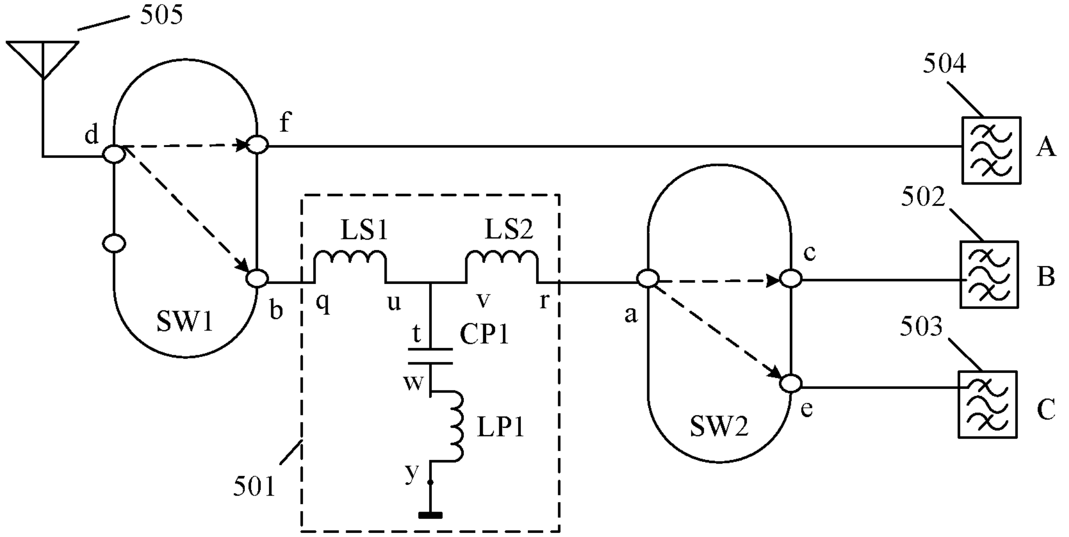
FIG. 9 is a schematic diagram in which a phase-shift filter that has both a function of a low-pass filter and a function of a phase shifter is coupled to a first switch group and a second switch group according to an embodiment of this application.

For example, based on FIG. 5, FIG. 9 is a schematic diagram in which a phase-shift filter 501 that has both a function of a low-pass filter and a function of a phase shifter is coupled to a first switch group SW1 and a second switch group SW2. The phase-shift filter 501 includes a first inductor LS1, a second inductor LS2, a third inductor LP1, and a capacitor CP1. A first end q of the first inductor LS1 is coupled to the second output end b of the first switch group SW1, a second end u of the first inductor LS1 is coupled to a first end v of the second inductor LS2, a second end r of the second inductor LS2 is coupled to the first input end a of the second switch group SW2, a first end t of the capacitor CP1 is coupled between the first inductor LS1 and the second inductor LS2, a second end w of the capacitor CP1 is connected in series to one end of the third inductor LP1, and the other end y of the third inductor LP1 is grounded.

Certainly, a structure of the phase-shift filter 501 that has a function of a low-pass filter and a function of phase shifter and that is shown in FIG. 9 is merely an example. A structure of the phase-shift filter 501 that has the function of a low-pass filter and the function of a phase shifter is not limited in this application.

In some embodiments, a phase-shifting amplitude existing when the phase-shift filter 501 performs phase-shifting is determined based on at least one of an inductance value of an inductor or a capacitance value of a capacitor in the phase-shift filter 501. For example, an inductance value ratio of the first inductor LS1 to the second inductor LS2 is used to adjust the phase-shifting amplitude.

Figure 10:
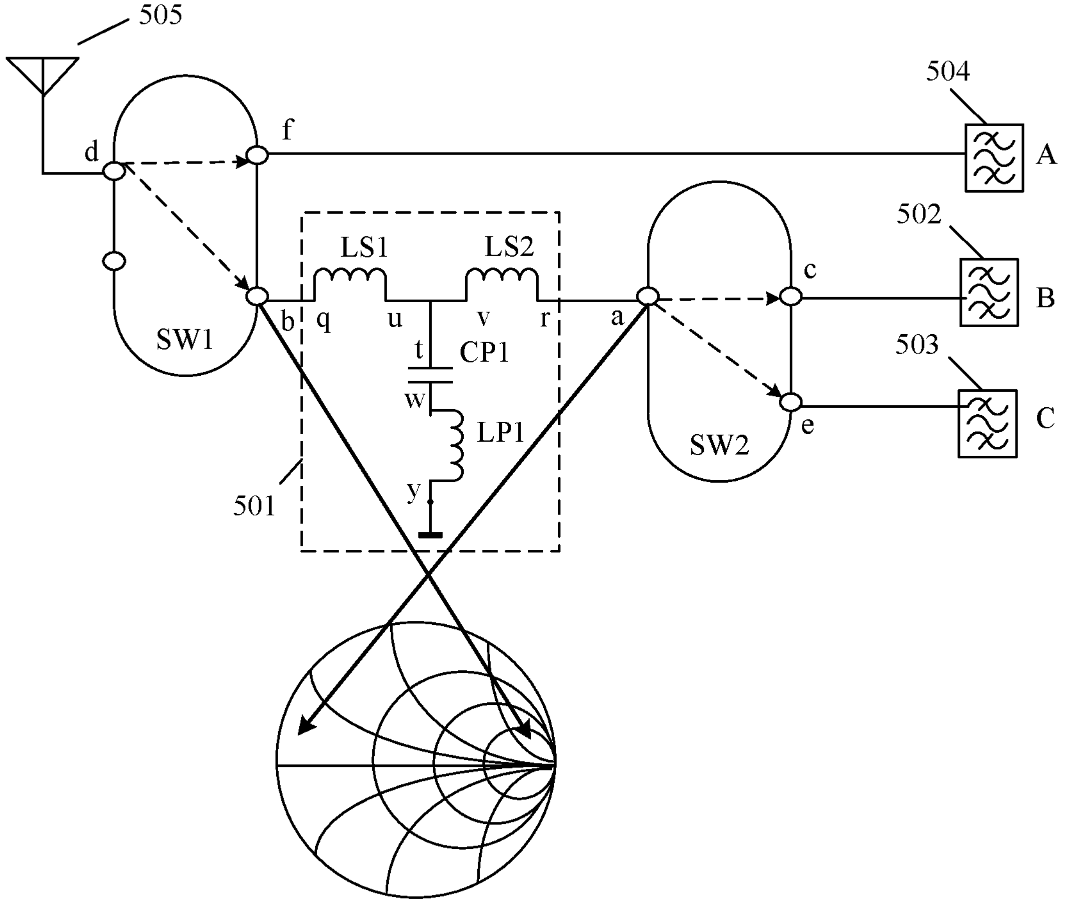
FIG. 10 is a schematic diagram of an impedance position shown in a Smith circle after a phase-shift filter performs phase-shifting on a first frequency band signal according to an embodiment of this application.

In some embodiments, the phase-shifting amplitude (phase-shifting amount) of the phase-shift filter 501 may be, for example, an amplitude greater than or equal to 90°, or may be 180°, or may be another value. This is not limited in this application. For example, as shown in FIG. 10, based on FIG. 5, FIG. 10 is a schematic diagram of an impedance position shown in a Smith circle after a phase-shift filter 501 performs phase-shifting on a first frequency band signal A. At the second output end b of the first switch group SW1, the impedances of the first frequency band signal A, the second frequency band signal B, and the third frequency band signal C are combined, and the second output end b is an impedance combination point. Based on the inductance value ratio of the first inductor LS1 to the second inductor LS2 of the phase-shift filter 501, the phase-shift filter 501 may perform phase-shifting, to enable the impedance of the input end a of the second switch group SW2 for the first frequency band signal A from an original circuit point to the open-circuit point, that is, perform phase-shifting, to enable the impedance of the frequency range of the first frequency band signal A to be in a high impedance state, where the phase-shifting amplitude is greater than 90°.

Therefore, in this application, when the phase shifter and the filter may be combined, to obtain a phase-shift filter that has both a filtering function and a phase-shifting function, an area and insertion loss costs caused by an independent phase shifter can be reduced.

Figure 11:
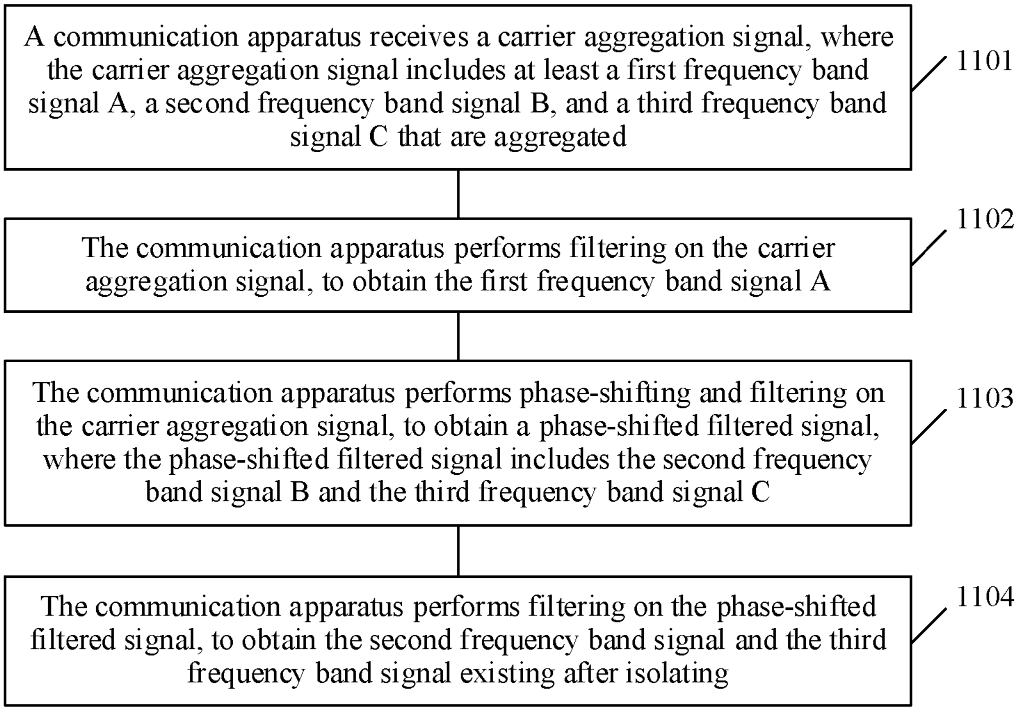
FIG. 11 is a schematic flowchart of a signal processing method according to an embodiment of this application.

Corresponding to the radio frequency front-end circuit shown in FIG. 5 to FIG. 7(*a*), FIG. 7(*b*), and FIG. 7(*c*), an embodiment of this application further provides a schematic flowchart of a signal processing method shown in FIG. 11. When the method is used in a communication apparatus, and the communication apparatus includes the radio frequency front-end circuit provided in this application, the method includes the following procedure.

1101: The communication apparatus receives a carrier aggregation signal, where the carrier aggregation signal includes at least a first frequency band signal A, a second frequency band signal B, and a third frequency band signal C that are aggregated.

1102: The communication apparatus performs filtering on the carrier aggregation signal, to obtain the first frequency band signal A.

For example, based on the radio frequency front-end circuit 50 provided in FIG. 5, if a frequency range of the first frequency band signal A is smaller than frequency ranges of the second frequency band signal B and the third frequency band signal C, the first filter 504 in the communication apparatus may be a low-pass filter, and can block the second frequency band signal B and the third frequency band signal C, to enable the first frequency band signal A to pass through.

1103: The communication apparatus performs phase-shifting and filtering on the carrier aggregation signal, to obtain a phase-shifted filtered signal, where the phase-shifted filtered signal includes the second frequency band signal B and the third frequency band signal C.

For example, based on the radio frequency front-end circuit 50 provided in FIG. 5, the phase-shift filter 501 in the communication apparatus may perform phase-shifting on the first frequency band signal A. After phase-shifting, an impedance of the frequency range of the first frequency band signal A is in a high impedance state in the phase-shift filter 501, to filter out the first frequency band signal A and obtain the phase-shifted filtered signal.

1104: The communication apparatus performs filtering on the phase-shifted filtered signal, to obtain the second frequency band signal and the third frequency band signal existing after isolating.

For example, based on the radio frequency front-end circuit 50 provided in FIG. 5, the second filter 502 may filter out the third frequency band signal C in the phase-shifted filtered signal, to enable the second frequency band signal B to pass through, and the third filter 503 may filter out the second frequency band signal B in the phase-shifted filtered signal, to enable the third frequency band signal C to pass through.

The signal processing method provided in this application can achieve beneficial effects similar to those of the radio frequency front-end circuit 50. Details are not described herein again.

In the foregoing embodiment, a process in which the radio frequency front-end circuit 50 provided in this application is used to receive the carrier aggregation signal is described. The following uses an example to describe a process in which the radio frequency front-end circuit 50 is used to send a carrier aggregation signal.

As shown in FIG. 5, when the radio frequency front-end circuit 50 is used to send the carrier aggregation signal, the first switch group SW1 includes the first input end f, where the first input end f is coupled to the first filter 504, and the first filter 504 is configured to output the first frequency band signal A to the first input end f.

The second switch group SW2 includes at least one second input end (for example, c and e), where the at least one second input end is coupled to the second filter 502 and the third filter 503, and the second filter 502 and the third filter 503 are configured to respectively output the second frequency band signal B and the third frequency band signal C to the at least one second input end.

The second switch group SW2 is further coupled to the phase-shift filter 501, and the second switch group SW2 is configured to selectively output the second frequency band signal B and the third frequency band signal C to the phase-shift filter 501.

The phase-shift filter 501 is coupled to the third input end b of the first switch group SW1, and is configured to: perform phase-shifting and filtering on a received frequency band signal, and output a phase-shifted filtered signal to the third input end d of the first switch group SW1, where the phase-shifted filtered signal includes the second frequency band signal B and the third frequency band signal C.

The first switch group SW1 is configured to selectively transmit the first frequency band signal A and the phase-shifted filtered signal to the antenna 505, where the first frequency band signal A and the phase-shifted filtered signal are aggregated by the antenna into a carrier aggregation signal and then transmitted.

Therefore, in this application, the phase-shift filter has both a phase-shifting function and a filtering function. For example, the phase-shift filter 501 has both a function of the filter between the first switch group SW1 and the second switch group SW2 and a function of the phase shifter coupled to the second filter 502. In other words, in a transmitting process of the carrier aggregation signal, a circuit of the phase shifter between the second switch group SW2 and the second filter 502 is omitted. In this way, the function of the phase shifter is combined with the function of the filter, and the filtering function and the phase-shifting function are implemented simultaneously, to reduce an area and insertion loss costs caused by an independent phase shifter. Especially, for enabling the filter to output a frequency band signal whose output frequency range is between frequency ranges of a plurality of frequency band signals on a transmit channel, for example, a frequency range of a second frequency band signal output by the second filter 502 is between a frequency range of a first frequency band signal and a frequency range of a third frequency band signal, if an independent phase shifter and an independent filter are used on the transmit channel to perform frequency band screening, a design of the phase shifter needs to meet that the two frequency band signals (the first frequency band signal and the third frequency band signal) are in a high impedance/open-circuit state simultaneously. In a conventional solution, a design of a phase shifter coupled to the second filter 502 is complex, and a caused insertion loss is large. If a function of the phase shifter on a channel on which screening is performed to obtain the frequency band signal whose frequency range is between frequency ranges of a plurality of frequency band signals is moved forward according to this application, a filter with a filtering function also has a phase-shifting function, that is, a phase-shift filter is used to implement phase-shifting, so that when at least one frequency band signal is blocked from passing through the phase-shift filter, an area and insertion loss costs caused by an independent phase shifter on the channel can be avoided.

In some embodiments, the phase-shift filter 501 is configured to: perform phase-shifting on the first frequency band signal A, and filter out the first frequency band signal A. For example, when the second input end c and the first output end a of the second switch group SW2 are conducted, in a case in which a frequency band signal input by the second filter 502 to the second input end c includes the first frequency band signal A, the phase-shift filter 501 may perform phase-shifting, to enable the impedance of the frequency range of the first frequency band signal A to be in a high impedance state, so as to block the first frequency band signal A from passing through the phase-shift filter 501. Similarly, when the second input end e and the first output end a of the second switch group SW2 are conducted, even if a frequency band signal input by the third filter 503 to the second input end e includes the first frequency band signal A, the phase-shift filter 501 may perform phase-shifting, to enable the impedance of the frequency range of the first frequency band signal Ato be in a high impedance state, so as to block the first frequency band signal A from passing through the phase-shift filter 501.

In some embodiments, similar to that in a receiving process, as shown in FIG. 6, the radio frequency front-end circuit 50 further includes:

the first filter 504 and the first phase shifter 601, where the first phase shifter 601 is coupled between the first input end f and the first filter 504, the first phase shifter 601 is configured to perform phase-shifting on the second frequency band signal B and the third frequency band signal C, and after phase-shifting, impedances of frequency ranges of the second frequency band signal B and the third frequency band signal C are in a high impedance state in the first filter 504.

In some embodiments, similar to that in the receiving process, the radio frequency front-end circuit 50 further includes the second filter 502 and the third filter 503. When there are a plurality of second input ends, the second filter 502 and the third filter 503 are separately coupled to one of the second input ends, the second filter 502 is coupled to the second input end c, and the third filter 503 is coupled to the second input end e.

The second filter 502 is configured to: filter out the third frequency band signal C from the received frequency band signal, and output the second frequency band signal B.

The third filter 503 is configured to: filter out the second frequency band signal B from the received frequency band signal, and output the third frequency band signal C.

In some embodiments, similar to that in the receiving process, refer to the radio frequency front-end circuit 50 shown in FIG. 7(*b*). The radio frequency front-end circuit 50 further includes the second phase shifter 702. The second phase shifter 702 is coupled between the third filter 503 and the second input end e corresponding to the third filter 503, and is configured to perform phase-shifting on the second frequency band signal B, and after phase-shifting, the impedance of the frequency range of the second frequency band signal B is in a high impedance state in the third filter 503.

If the frequency range of the second frequency band signal B is between the frequency range of the first frequency band signal A and the frequency range of the third frequency band signal C, on the basis that the phase shifter coupled to the second filter 502 is omitted, phase-shifting design complexity caused by a fact that the phase shifter coupled to the second filter 502 in a conventional solution needs to meet that impedances of two frequency band signals are in a high impedance state can be avoided.

In some embodiments, when the second filter 502 and the third filter 503 are coupled to a same second input end c, the second filter 502 and the third filter 503 are two filters in the multiplexer 704.

Similar to that in the receiving process, in some embodiments of the transmitting process, the phase-shift filter 501 includes a function of a phase shifter and a function of a low-pass filter. Alternatively, the phase-shift filter 501 includes a function of a phase shifter and a function of a band-pass filter. Alternatively, the phase-shift filter 501 includes a function of a phase shifter, a function of a low-pass filter, and a function of a band-rejection filter.

Similar to that in the receiving process, in some embodiments of the transmitting process, a phase-shifting amplitude existing when the phase-shift filter 501 performs phase-shifting is determined based on at least one of an inductance value of an inductor or a capacitance value of a capacitor in the phase-shift filter 501.

Similar to that in the receiving process, when the phase-shift filter 501 includes a function of a low-pass filter and a phase-shifting function, for a specific circuit of the phase-shift filter 501, refer to a circuit design of 501 shown in FIG. 9.

The phase-shift filter 501 includes the first inductor LS1, the second inductor LS2, the third inductor LP1, and the capacitor CP1. The first end q of the first inductor LS1 is coupled to a third input end b of the first switch group SW1, the second end u of the first inductor LS1 is coupled to the first end v of the second inductor LS2, the second end r of the second inductor LS2 is coupled to a first output end a of the second switch group SW2, the first end t of the capacitor CP1 is coupled between the first inductor LS1 and the second inductor LS2, the second end w of the capacitor CP1 is connected in series to one end of the third inductor LP1, and the other end y of the third inductor LP1 is grounded.

In some embodiments, the plurality of frequency bands in the carrier aggregation signal in this embodiment of this application may include, for example, a plurality of frequency bands in high frequency bands, medium frequency bands, low and medium frequency bands, and low frequency bands. Table 1 shows an example of a frequency band range.

TABLE 1

| | |
|---|---|
| High frequency band | May be a frequency band higher than 2.3 GHz, for example, N40, N41, B7, B30, N79, N77 or N78. |
| Medium frequency band | May be a frequency band from 1.7 GHz to 2.3 GHz, for example, N1, N3, B25(22), B34, B39 or B66. |
| Low and medium frequency band | May be a frequency band from 1 GHz to 1.6 GHz, for example, N75, N76, or B32. |
| Low frequency band | May be a frequency band lower than 1 GHz, for example, B5, B8, N71, B20, B12, B13 or B28. |

Certainly, a frequency band in the carrier aggregation signal in this application is not limited to the examples, and may also include a signal of another frequency band.

For example, as shown in FIG. 5 to FIG. 7(*a*), FIG. 7(*b*), and FIG. 7(*c*), a frequency band of the first frequency band signal A is one of high frequency bands, a frequency band of the second frequency band signal B is one of medium frequency bands, and a frequency band of the third frequency band signal C is one of low and medium frequency bands or low frequency bands. Alternatively, a frequency band of the first frequency band signal A is one of low and medium frequency bands or low frequency bands, a frequency band of the second frequency band signal B is one of medium frequency bands, and a frequency band of the third frequency band signal C is one of high frequency bands.

For another example, as shown in FIG. 9, in a radio frequency front-end of two phase-shift filters, a frequency band of the first frequency band signal A is one of high frequency bands, a frequency band of the second frequency band signal B is one of high and medium frequency bands, a frequency band of the third frequency band signal C is one of medium frequency bands, and a frequency band of the fourth frequency band signal D is one of low frequency bands. Alternatively, a frequency band of the first frequency band signal A is one of low frequency bands, a frequency band of the second frequency band signal B is one of medium frequency bands, a frequency band of the third frequency band signal C is one of high and medium frequency bands, and a frequency band of the fourth frequency band signal D is one of high frequency bands.

Therefore, in this application, for the radio frequency front-end circuit, a complex phase shifter can be reduced, and an insertion loss, costs, and an area caused by the phase shifter can be reduced. This is equivalent to reducing a link insertion loss, improving circuit efficiency on a transmit channel, reducing a noise factor in a receiving circuit, and improving overall performance of a circuit architecture module.

An embodiment of this application further provides an electronic device. The electronic device may be, for example, a terminal device. The terminal device includes one or more processors, one or more memories, and the radio frequency front-end circuit. The one or more memories are coupled to the one or more processors, the one or more memories are configured to store computer program code, and the computer program code includes computer instructions. The radio frequency front-end circuit is configured to send a carrier aggregation signal or receive a carrier aggregation signal.

In addition, an embodiment of this application further provides an apparatus. The apparatus may be specifically a chip, a component, or a module. The apparatus may include the radio frequency front-end circuit.

Figure 12:
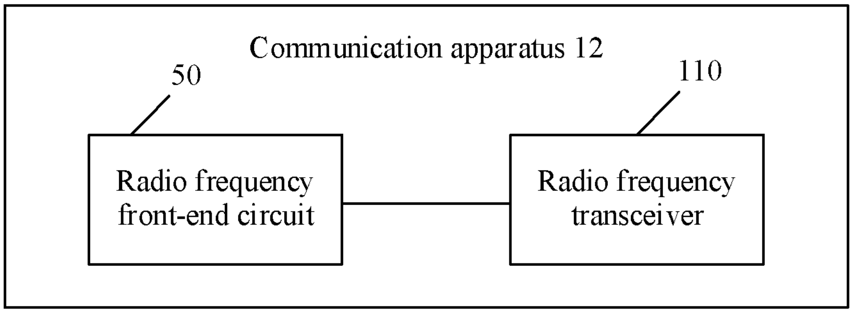
FIG. 12 is a schematic diagram of a structure of a communication apparatus according to an embodiment of this application.

FIG. 12 is a schematic diagram of a structure of a communication apparatus 12 according to an embodiment of this application. The communication apparatus 12 includes the radio frequency front-end circuit 50 used in a receiving process and/or a transmitting process and a radio frequency transceiver 110.

The radio frequency transceiver 110 may be understood as a radio frequency transceiver semiconductor, and may include one logical region and one analog circuit region. The radio frequency transceiver 110 can convert a digital signal from a modem chip (baseband processor) into an analog signal, convert a frequency of the analog signal into a radio frequency that can be used by a user, and then send a converted signal through a radio frequency front-end module and an antenna. In addition, the radio frequency transceiver 110 can convert an external signal received through the radio frequency front-end circuit 50 into a digital signal, and transmit the digital signal to the modem chip. The radio frequency front-end circuit 50 is a part between the baseband processor and the antenna, may convert a binary signal into a high-frequency radio electromagnetic wave signal in a signal transmission process, and convert a received electromagnetic wave signal into a binary digital signal in a signal receiving process. The radio frequency front-end circuit 50 may generally include components such as a PA, a filter, a duplexer, a radio frequency switch, and a low noise amplifier.

For example, when the communication apparatus 12 is a terminal device, the terminal device may include the antenna, the radio frequency front-end circuit 50, the radio frequency transceiver 110, the baseband processor (BP), an application processor (AP), a memory, a power management module, another peripheral circuit (for example, an audio module, a display module, or a camera module), and the like.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiment of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio frequency front-end circuit, comprising:

a first switch group, comprising a first output end and a second output end, wherein the first switch group is configured to selectively transmit, to the first output end and the second output end, a carrier aggregation signal received from an antenna, wherein the carrier aggregation signal comprises at least a first frequency band signal, a second frequency band signal, and a third frequency band signal that are aggregated, wherein the first output end is coupled to a first filter, wherein the first filter is configured to:

perform filtering on the carrier aggregation signal, and output the first frequency band signal;

a phase-shift filter coupled to the second output end, the phase-shift filter configured to:

perform phase-shifting and filtering on the carrier aggregation signal; and output a phase-shifted filtered signal, wherein the phase-shifted filtered signal comprises the second frequency band signal and the third frequency band signal; and a second switch group, coupled to the phase-shift filter, wherein the second switch group comprises at least one third output end, wherein each third output end is configured to output the phase-shifted filtered signal, wherein the at least one third output end is coupled to a second filter and a third filter, and wherein the second filter and the third filter are configured to:

perform, separately, filtering on the phase-shifted filtered signal; and output, respectively, the second frequency band signal and the third frequency band signal;

wherein the phase-shift filter comprises a function of a phase shifter and a function of a low-pass filter, wherein the phase-shift filter comprises a first inductor, a second inductor, a third inductor, and a capacitor, wherein a first end of the first inductor is coupled to the second output end, wherein a second end of the first inductor is coupled to a first end of the second inductor, wherein a second end of the second inductor is coupled to a first input end of the second switch group, wherein a first end of the capacitor is coupled between the first inductor and the second inductor, and wherein a second end of the capacitor is connected in series to the third inductor.

2. The radio frequency front-end circuit according to claim 1, wherein the phase-shift filter is configured to:

perform phase-shifting on the first frequency band signal; and filter out the first frequency band signal.

3. The radio frequency front-end circuit according to claim 2, wherein after phase-shifting, an impedance of a frequency range of the first frequency band signal is in a first impedance state in the phase-shift filter that is higher than a second impedance state.

4. The radio frequency front-end circuit according to claim 1, wherein the radio frequency front-end circuit further comprises:

the first filter and a first phase shifter, wherein the first phase shifter is coupled between the first output end and the first filter, wherein the first phase shifter is configured to perform phase-shifting on the second frequency band signal and the third frequency band signal, and wherein, after phase-shifting, impedances of frequency ranges of the second frequency band signal and the third frequency band signal are in a first impedance state in the first filter that is higher than a second impedance state.

5. The radio frequency front-end circuit according to claim 1, wherein the radio frequency front-end circuit further comprises the second filter and the third filter, wherein, when there are a plurality of third output ends, the second filter and the third filter are separately coupled to one of the third output ends, wherein the second filter is configured to:

filter out the third frequency band signal from the phase-shifted filtered signal; and output the second frequency band signal; and wherein the third filter is configured to:

filter out the second frequency band signal from the phase-shifted filtered signal; and output the third frequency band signal.

6. The radio frequency front-end circuit according to claim 5, wherein the radio frequency front-end circuit further comprises:

a second phase shifter, wherein the second phase shifter is coupled between the third filter and the third output end corresponding to the third filter, wherein the second phase shifter is configured to perform phase-shifting on the second frequency band signal, and wherein, after phase-shifting, impedance of a frequency range of the second frequency band signal is in a first impedance state in the third filter that is higher than a second impedance state, and wherein the frequency range of the second frequency band signal is between the frequency range of the first frequency band signal and the frequency range of the third frequency band signal.

7. The radio frequency front-end circuit according to claim 1, wherein an inductance value ratio of the first inductor and the second inductor is used to adjust a phase-shifting amplitude.

8. The radio frequency front-end circuit according to claim 7, wherein a phase-shifting amplitude of a phase of the first frequency band signal is 90°.

9. A radio frequency front-end circuit, comprising:

a first switch group, comprising a first output end and a second output end, wherein the first switch group is configured to selectively transmit, to the first output end and the second output end, a carrier aggregation signal received from an antenna, wherein the carrier aggregation signal comprises at least a first frequency band signal, a second frequency band signal, and a third frequency band signal that are aggregated, wherein the first output end is coupled to a first filter, wherein the first filter is configured to:

perform filtering on the carrier aggregation signal, and output the first frequency band signal;

a phase-shift filter coupled to the second output end, the phase-shift filter configured to:

perform phase-shifting and filtering on the carrier aggregation signal; and output a phase-shifted filtered signal, wherein the phase-shifted filtered signal comprises the second frequency band signal and the third frequency band signal; and a second switch group, coupled to the phase-shift filter, wherein the second switch group comprises at least one third output end, wherein each third output end is configured to output the phase-shifted filtered signal, wherein the at least one third output end is coupled to a second filter and a third filter, and wherein the second filter and the third filter are configured to:

perform, separately, filtering on the phase-shifted filtered signal; and output, respectively, the second frequency band signal and the third frequency band signal;

wherein, when the second filter and the third filter are coupled to a same third output end, the second filter and the third filter are two filters in a multiplexer.

10. The radio frequency front-end circuit according to claim 9, wherein the phase-shift filter is configured to:

perform phase-shifting on the first frequency band signal; and filter out the first frequency band signal.

11. A radio frequency front-end circuit, comprising:

a first switch group, comprising a first input end, wherein the first input end is coupled to a first filter, wherein the first filter is configured to output a first frequency band signal to the first input end; and a second switch group, comprising at least one second input end, wherein the at least one second input end is coupled to a second filter and a third filter, wherein the second filter and the third filter are configured to output, respectively, a second frequency band signal and a third frequency band signal to the at least one second input end, wherein the second switch group is further coupled to a phase-shift filter, wherein the second switch group is configured to selectively output the second frequency band signal and the third frequency band signal to the phase-shift filter, wherein the phase-shift filter is coupled to a third input end of the first switch group, wherein the phase-shift filter is configured to:

perform phase-shifting and filtering on a received frequency band signal; and output a phase-shifted filtered signal to the third input end of the first switch group, wherein the phase-shifted filtered signal comprises the second frequency band signal and the third frequency band signal, and wherein the first switch group is configured to selectively transmit the first frequency band signal and the phase-shifted filtered signal to an antenna, wherein the first frequency band signal and the phase-shifted filtered signal are aggregated by the antenna into a carrier aggregation signal, and wherein the carrier aggregation signal is transmitted;

wherein the phase-shift filter comprises a function of a phase shifter and a function of a low-pass filter, wherein the phase-shift filter comprises a first inductor, a second inductor, a third inductor, and a capacitor, wherein a first end of the first inductor is coupled to the third input end, wherein a second end of the first inductor is coupled to a first end of the second inductor, wherein a second end of the second inductor is coupled to a first output end of the second switch group, wherein a first end of the capacitor is coupled between the first inductor and the second inductor, and wherein a second end of the capacitor is connected in series to the third inductor.

12. The radio frequency front-end circuit according to claim 11, wherein the phase-shift filter is configured to:

perform phase-shifting on the first frequency band signal; and filter out the first frequency band signal.

13. The radio frequency front-end circuit according to claim 12, wherein, after phase-shifting, an impedance of a frequency range of the first frequency band signal is in a first impedance state in the phase-shift filter that is higher than a second impedance state.

14. The radio frequency front-end circuit according to claim 11, wherein the radio frequency front-end circuit further comprises:

the first filter and a first phase shifter, wherein the first phase shifter is coupled between the first input end and the first filter, wherein the first phase shifter is configured to perform phase-shifting on the second frequency band signal and the third frequency band signal, and wherein, after phase-shifting, impedances of frequency ranges of the second frequency band signal and the third frequency band signal are in a first impedance state in the first filter that is higher than a second impedance state.

15. The radio frequency front-end circuit according to claim 11, wherein the radio frequency front-end circuit further comprises the second filter and the third filter, wherein, when there are a plurality of second input ends, the second filter and the third filter are separately coupled to one of the plurality of second input ends, wherein the second filter is configured to:

filter out the third frequency band signal from the received frequency band signal; and output the second frequency band signal, and wherein the third filter is configured to:

filter out the second frequency band signal from the received frequency band signal; and output the third frequency band signal.

16. The radio frequency front-end circuit according to claim 15, wherein the radio frequency front-end circuit further comprises:

a second phase shifter, wherein the second phase shifter is coupled between the third filter and a second input end corresponding to the third filter, wherein the second phase shifter is configured to perform phase-shifting on the second frequency band signal, wherein, after phase-shifting, impedance of a frequency range of the second frequency band signal is in a first impedance state in the third filter that is higher than a second impedance state, wherein the frequency range of the second frequency band signal is between the frequency range of the first frequency band signal and the frequency range of the third frequency band signal.

17. The radio frequency front-end circuit according to claim 11, wherein, when the second filter and the third filter are coupled to a same second input end, the second filter and the third filter are two filters in a multiplexer.

18. The radio frequency front-end circuit according to claim 11, wherein an inductance value ratio of the first inductor and the second inductor is used to adjust a phase-shifting amplitude.

19. The radio frequency front-end circuit according to claim 18, wherein a phase-shifting amplitude of a phase of the first frequency band signal is 90°.

20. A communication apparatus, the communication apparatus comprising the radio frequency front-end circuit according to claim 1 and a radio frequency transceiver.

* * * * *